(12) United States Patent
Tanaka et al.

(10) Patent No.: US 10,595,270 B2
(45) Date of Patent: Mar. 17, 2020

(54) INFORMATION PROCESSING APPARATUS, COMMUNICATION SYSTEM, INFORMATION PROCESSING METHOD AND PROGRAM

(71) Applicant: SONY CORPORATION, Tokyo (JP)

(72) Inventors: Yusuke Tanaka, Tokyo (JP); Eisuke Sakai, Tokyo (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 54 days.

(21) Appl. No.: 15/565,948

(22) PCT Filed: Apr. 14, 2016

(86) PCT No.: PCT/JP2016/061976
§ 371 (c)(1),
(2) Date: Oct. 12, 2017

(87) PCT Pub. No.: WO2016/203831
PCT Pub. Date: Dec. 22, 2016

(65) Prior Publication Data
US 2018/0115949 A1 Apr. 26, 2018

(30) Foreign Application Priority Data
Jun. 18, 2015 (JP) ................................. 2015-122519

(51) Int. Cl.
*H04W 52/02* (2009.01)
*H04W 28/02* (2009.01)
(Continued)

(52) U.S. Cl.
CPC ......... *H04W 52/0216* (2013.01); *H04L 12/28* (2013.01); *H04L 12/4625* (2013.01);
(Continued)

(58) Field of Classification Search
None
See application file for complete search history.

(56) References Cited

U.S. PATENT DOCUMENTS 8,135,346 B2 * 3/2012 Zhodzishsky ......... G06F 1/3209
455/127.5
9,374,190 B2 * 6/2016 Koskela .................... H04L 1/00
(Continued)

FOREIGN PATENT DOCUMENTS

JP 2010-124058 A 6/2010
JP 2013-214891 A 10/2013
(Continued)

OTHER PUBLICATIONS

Wi-Fi Alliance Technical Committee P2P Task Group, "Wi-Fi Peer-to-Peer (P2P) Technical Specification Version 1.2," 2010 Wi-Fi Alliance, Dec. 14, 2011, (159 pages).
(Continued)

*Primary Examiner* — Steve R Young
(74) *Attorney, Agent, or Firm* — Xsensus, LLP

(57) ABSTRACT

An information processing apparatus includes a control section, and can temporarily pause at least some of its own functions. The control section of the information processing apparatus performs control for notifying, when at least some of its own functions are to be temporarily paused, a first apparatus that has a specific function of a function temporary pause period within which at least some of functions of the first apparatus are to be temporarily paused. Further, the control section of the information processing apparatus performs control for directing, when at least some of its own functions are to be temporarily paused, a second apparatus that does not have a specific function to restrain transmission. Power consumption of the information processing apparatus can be reduced.

20 Claims, 16 Drawing Sheets

EXAMPLE OF SETTING OF FUNCTION TEMPORARY PAUSE STATE AND TRANSMISSION RESTRAINT STATE

(51) Int. Cl.
  *H04W 84/12* (2009.01)
  *H04L 12/28* (2006.01)
  *H04L 12/46* (2006.01)

(52) U.S. Cl.
  CPC ....... *H04W 52/02* (2013.01); *H04W 52/0229* (2013.01); *H04W 84/12* (2013.01); *H04W 28/0221* (2013.01); *Y02D 70/00* (2018.01); *Y02D 70/142* (2018.01); *Y02D 70/164* (2018.01); *Y02D 70/21* (2018.01); *Y02D 70/22* (2018.01)

(56) References Cited

U.S. PATENT DOCUMENTS

| | | | |
|---|---|---|---|
| 10,051,682 B2* | 8/2018 | Vangala | H04W 28/0268 |
| 2009/0110110 A1* | 4/2009 | Kyusojin | H04L 47/10 375/295 |
| 2011/0211564 A1* | 9/2011 | Yoneyama | H04W 52/0251 370/338 |
| 2012/0045005 A1* | 2/2012 | Kim | H04W 52/0216 375/260 |
| 2015/0358067 A1* | 12/2015 | Zhang | H04W 52/0216 370/315 |
| 2016/0066274 A1* | 3/2016 | Pujari | H04W 52/0235 370/311 |
| 2017/0127428 A1* | 5/2017 | Adachi | H04W 72/085 |
| 2017/0339641 A1* | 11/2017 | Nigam | H04W 52/0216 |

FOREIGN PATENT DOCUMENTS

| | | |
|---|---|---|
| JP | 2013-251614 A | 12/2013 |
| JP | 2014-525201 A | 9/2014 |

OTHER PUBLICATIONS

Chun-hsiang Huang, et al., "A Reservation-less Sleep Control Method for Wireless LAN Access Points," The Institute of Electronics, Information and Communication Engineers, IEICE Technical Report RCS2011-236, Dec. 2011, (18 pages) (with English translation).

International Search Report dated Jul. 5, 2016 in PCT/JP2016/061976 filed Apr. 14, 2016.

* cited by examiner

EXAMPLE OF IE THAT NOTIFIES THAT FUNCTION TEMPORARY PAUSE FUNCTION IS PROVIDED

EXAMPLE OF IE FOR NOTIFICATION OF FUNCTION TEMPORARY PAUSE PERIOD

EXAMPLE OF SETTING OF FUNCTION TEMPORARY PAUSE STATE
AND TRANSMISSION RESTRAINT STATE

EXAMPLE OF SETTING OF FUNCTION TEMPORARY PAUSE STATE
AND TRANSMISSION RESTRAINT STATE

EXAMPLE OF SETTING OF FUNCTION TEMPORARY PAUSE STATE AND TRANSMISSION RESTRAINT STATE

EXAMPLE OF SETTING OF FUNCTION TEMPORARY PAUSE STATE
AND TRANSMISSION RESTRAINT STATE

EXAMPLE OF SETTING OF FUNCTION TEMPORARY PAUSE STATE
AND TRANSMISSION RESTRAINT STATE

EXAMPLE OF SETTING OF FUNCTION TEMPORARY PAUSE STATE
AND TRANSMISSION RESTRAINT STATE

EXAMPLE OF SETTING OF FUNCTION TEMPORARY PAUSE STATE
AND TRANSMISSION RESTRAINT STATE

INFORMATION PROCESSING APPARATUS, COMMUNICATION SYSTEM, INFORMATION PROCESSING METHOD AND PROGRAM

TECHNICAL FIELD

The present technology relates to an information processing apparatus. Particularly, the present technology relates to an information processing apparatus, a communication system and an information processing method for performing exchange of information utilizing wireless communication and a program for causing a computer to execute the method.

BACKGROUND ART

A wireless communication technology for performing exchange of information utilizing wireless communication has been available. For example, a communication method for performing exchange of information between different information processing apparatus utilizing a wireless local area network (LAN) has been proposed. Further, as apparatus that perform exchange of information utilizing wireless communication, mobile bodies such as a portable telephone set and a smartphone are available.

Such mobile bodies frequently have a battery as a power supply. Therefore, the mobile bodies are limited in operating time. Thus, technologies for reducing power consumption have been proposed in order to extend the operating time.

For example, a technology for reducing, when a mobile body need not perform communication, the power consumption by entering a power saving state in which transmission and reception of a signal are not performed and the power consumption is low has been proposed. For example, in Institute of Electrical and Electronic Engineers (IEEE) 802.11 that is a standard specification for a wireless LAN that is spread widely, a protocol for notifying a master unit that a slave unit enters a power saving state is defined. Here, it has been assumed that the master unit is linked to a fixed power supply. However, in recent years, a mobile body that is driven by a battery sometimes has a function of a base station. Therefore, a technology for reducing the power consumption by causing a base station to enter a power saving state is important.

As a technology for making it possible for a base station to enter a power saving state, a standard for allowing different Wireless Fidelity (Wi-Fi)-incorporating apparatus to be directly connected to each other by wireless connection without by way of a router has been proposed (for example, refer to NPL 1). This standard is a standard prescribed by Wi-Fi Alliance.

In this standard, protocols for allowing a wireless apparatus (group owner (GO)) that plays a role of a base station to enter a power saving state are defined. As one of such protocols, a protocol called notice of absence (NoA) is defined. This NoA indicates a procedure for notifying a slave unit of a period within which a GO is to enter a power saving state in advance using a Beacon or the like.

Further, for example, a method is proposed by which a terminal different from a terminal that is in a power saving state has a function as a proxy for temporarily retaining data destined for the terminal that is in a power saving state such that the data is prevented from being discarded (for example, refer to PTL 1). According to this method, if the terminal having the function as a proxy confirms data destined for the terminal that is in a power saving state on a network, then it decides whether or not the data is to be retained. Further, the terminal having the function as a proxy decides whether or not a signal for cancelling the power saving state is to be transmitted to the terminal that is in a power saving state. Then, if the data is retained, then when the terminal that is in a power saving state cancels the power saving state, the retained data is transmitted to the terminal. Consequently, the data destined for the terminal having been in a power saving state is sent correctly without being discarded.

CITATION LIST

Non Patent Literature

[NPL 1]
Wi-Fi Peer-to-Peer (P2P) Technical Specification

PATENT LITERATURE

[PTL 1]
JP 2014-525201A

SUMMARY

Technical Problems

With the related art described above, a base station can enter a power saving state.

However, in the standard of NPL 1, it is prescribed that, if slave units connected to a base station include even one slave unit that is not compatible with the standard, then the base station cannot enter a power saving state. Therefore, for example, where a plurality of slave units exist, if they include an old slave unit or units that are not compatible with the standard, then a power saving state cannot be entered.

Further, in the technology of PTL 1, in order for the base station to enter a power saving state, a different terminal having a function as a proxy must exist. However, where a mobile body functions as a base station, it is supposed that a different terminal that has a function as a proxy may not exist. Further, in the technology of PTL 1, the different terminal having a function as a proxy cannot enter a power saving state. Further, in the technology of PTL 1, a protocol is required for causing the different terminal having a function as a proxy to cancel the power saving state of the terminal having been in the power saving state.

Therefore, it is significant to cause, for example, even in a case in which a slave unit that does not have a specific function is connected, in another case in which a terminal having a function as a proxy does not exist or in a like case, the base station to enter a power saving state to reduce the power consumption of the individual apparatus.

The present technology has been created in view of such a situation as described above, and it is an object of the present technology to reduce the power consumption in an information processing apparatus.

Solution to Problems

The present technology has been created in order to solve the problems described above, and a first aspect of the present technology is an information processing apparatus including a control section that performs control for notifying, when at least some of functions of the own apparatus is to be temporarily paused, a first apparatus that has a specific function of a function temporary pause period within which at least some of functions of the first apparatus is to be temporarily paused and directing a second apparatus that does not have the specific function to restrain transmission, and an information processing method for the information processing apparatus and a program for causing a computer to execute the method. This brings about action that, when at least some of the functions of the own apparatus is to be temporarily paused, a notification of the function temporary pause period is issued to the first apparatus that has the specific function, and a direction for transmission restraint is issued to the second apparatus that does not have the specific function.

Further, in this first aspect, the specific function may be a function capable of understanding a frame for the notification of the function temporary pause period. This brings about action that a notification of the function temporary pause period is issued to the first apparatus that can understand the frame for the notification of the function temporary pause period.

Further, in this first aspect, the information processing apparatus may be an information processing apparatus that has a function as a base station, and the control section may notify, when the function as the base station is to be temporarily paused, the first apparatus of the function temporary pause period and direct the transmission restraint to the second apparatus. This brings about action that, when the function as the base station is to be temporarily paused, a notification of the function temporary pause period is issued to the first apparatus and the transmission restraint is directed to the second apparatus.

Further, in this first aspect, the control section may perform, when the function as the base station is to be temporarily carried out within a period within which the function as the base station is to be temporarily paused, direction for cancelling the transmission restraint to the second apparatus and direct the transmission restraint to the second apparatus again after the temporary carrying out is performed with the second apparatus. This brings about action that, when the function as the base station is to be temporarily carried out within a period within which the function as the base station is to be temporarily paused, a direction for cancelling the transmission restraint is issued to the second apparatus, and after the temporary carrying out is performed with the second apparatus, a direction for the transmission restraint is issued to the second apparatus again.

Further, in this first aspect, the control section may set at least one or more periods, within which the function as the base station is to be temporarily carried out, within the function temporary pause period of the first apparatus. This brings about action that at least one or more periods, within which the function as the base station is to be temporarily carried out, are set within the function temporary pause period of the first apparatus.

Further, in this first aspect, the control section may determine a period, within which the function as the base station is to be temporarily carried out, based on information regarding the second apparatus or information regarding a power supply of the information processing apparatus. This brings about action that a period, within which the function as the base station is to be temporarily carried out, is determined based on information regarding the second apparatus or information regarding a power supply of the information processing apparatus.

Further, in this first aspect, the control section may use, as the information regarding the second apparatus, at least one of a quantity or a ratio of the second apparatus connected to the information processing apparatus, a permissible delay of traffic handled by the second apparatus connected to the information processing apparatus and presence or absence of data accumulated in the second apparatus. This brings about action that, as the information regarding the second apparatus, at least one of a quantity or a ratio of the second apparatus connected to the information processing apparatus, a permissible delay of traffic handled by the second apparatus connected to the information processing apparatus and presence or absence of data accumulated in the second apparatus is used.

Further, in this first aspect, the control section may direct the transmission restraint to the second apparatus after a point of time of start of the function temporary pause period notified to the first apparatus. This brings about action that a direction for the transmission restraint is issued to the second apparatus after a point of time of start of the function temporary pause period notified to the first apparatus.

Further, in this first aspect, the control section may set a period longer than a temporary pause period of the information processing apparatus as the function temporary pause period for the first apparatus. This brings about action that a period longer than a temporary pause period of the information processing apparatus is set as the function temporary pause period for the first apparatus.

Further, in this first aspect, the control section may transmit a frame, which includes the function temporary pause period and a start timing of the function temporary pause period, as a frame for the notification of the function temporary pause period to the first apparatus. This brings about action that a frame, which includes the function temporary pause period and a start timing of the function temporary pause period, is transmitted as a frame for the notification of the function temporary pause period to the first apparatus.

Further, in this first aspect, the control section may notify, when a notification that the first apparatus has the specific function is received from the first apparatus, the first apparatus of the function temporary pause period. This brings about action that, when a notification that the first apparatus has the specific function is received from the first apparatus, a notification of the function temporary pause period is issued to the first apparatus.

Further, in this first aspect, the temporary pause of the information processing apparatus may be at least one of a temporary pause for allowing the information processing apparatus to enter a power saving state, a temporary pause of functions other than a function for temporarily pausing a function of a group to which the information processing apparatus belongs while allowing a function of a group different from the group to be carried out, and a temporary pause of functions other than a function for temporarily pausing a function of the group to which the information processing apparatus belongs while searching for a new group to which the information processing apparatus is to belong. This brings about action that the temporary pause of the information processing apparatus is at least one of the temporary pauses.

Meanwhile, a second aspect of the present technology is an information processing apparatus including a control section that performs, when at least some of functions of a different apparatus is to be temporarily paused, control for setting, based on a function temporary pause period notified from the different apparatus, a period within which at least some of functions of the own apparatus is to be temporarily paused, and an information processing method for the information processing apparatus and a program for causing a computer to execute the method. This brings about action that a period within which at least some of functions of the own apparatus is to be temporarily paused is set based on a function temporary pause period notified from the different apparatus.

Further, in this second aspect, the control section may perform control for notifying the different apparatus that the information processing apparatus has a specific function for understanding a frame for the notification of the function temporary pause period. This brings about action that a notification that the information processing apparatus has the specific function for understanding a frame for the notification of the function temporary pause period is issued to the different apparatus.

Further, in this second aspect, the function temporary pause period notified from the different apparatus may be a period longer than a function temporary pause period set to the different apparatus. This brings about action that the function temporary pause period notified from the different apparatus is a period longer than a function temporary pause period set to the different apparatus.

Further, a third aspect of the present technology is a communication system including: a first information processing apparatus that notifies, when at least some of functions of the first information processing apparatus is to be temporarily paused, a second information processing apparatus, which has a specific function, of a function temporary pause period within which at least some of functions of the second information processing apparatus is to be temporarily paused, and directs transmission restraint to a third information processing apparatus, which does not have the specific function; the second information processing apparatus that temporarily pauses, when the notification of the function temporary pause period is received from the first information processing apparatus, at least some of the functions of the second information processing apparatus; and the third information processing apparatus that sets the transmission restraint when the direction for the transmission restraint is received from the first information processing apparatus. The third aspect of the present technology also includes an information processing method for the communication system and a program for causing a computer to execute the method. This brings about action that the first information processing apparatus notifies, when at least some of functions of the first information processing apparatus is to be temporarily paused, the second information processing apparatus, which has the specific function, of a function temporary pause period, and directs transmission restraint to the third information processing apparatus, which does not have the specific function, that the second information processing apparatus temporarily pauses, when the notification of the function temporary pause period is received from the first information processing apparatus, at least some of the functions of the second information processing apparatus, and that the third information processing apparatus sets the transmission restraint when the direction for the transmission restraint is received from the first information processing apparatus.

Advantageous Effect of Invention

With the present technology, a superior effect that the power consumption of the information processing apparatus can be reduced can be achieved. It is to be noted that the effect described here is not necessarily limitative, but any of effects described in the present disclosure may be exhibited.

DESCRIPTION OF EMBODIMENTS

In the following, modes for carrying out the present technology (hereinafter referred to as embodiments) are described. The description is given in the following order.

1. First Embodiment (example in which a base station notifies a slave unit other than a legacy apparatus of a function temporary pause period to place the slave unit into a function temporary pause state and issues a transmission restraint direction to the legacy apparatus to place the legacy apparatus into a transmission restraint state)

2. Second Embodiment (example in which a period within which a function as a base station is to be temporarily carried out is determined on the basis of information regarding a legacy apparatus or power supply information of the base station)

3. Application Examples

<1. First Embodiment>
(Example of Configuration of Communication System)

Figure 1:
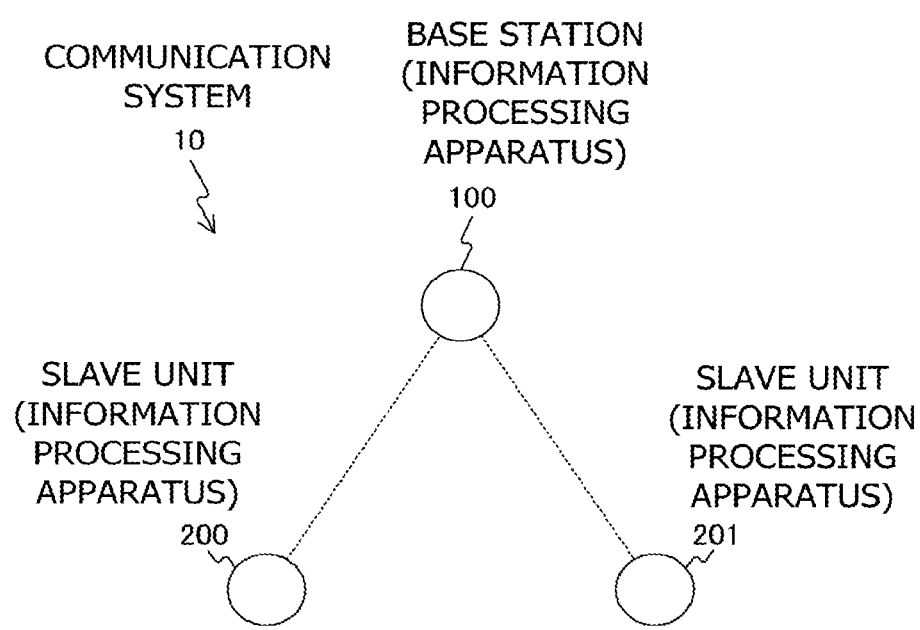
FIG. 1 is a view depicting an example of a configuration of a communication system 10 according to a first embodiment of the present technology.

FIG. 1 is a view depicting an example of a configuration of a communication system 10 in a first embodiment of the present technology.

In FIG. 1, an example of the communication system 10 is depicted in which a wireless network is configured from three apparatus (a base station (information processing apparatus) 100, a slave unit (information processing apparatus) 200 and another slave unit (information processing apparatus) 201). Further, in FIG. 1, an example is depicted in which, to one (for example, the base station (information processing apparatus) 100) of the three apparatus, the other two apparatus (for example, the slave unit (information processing apparatus) 200 and the slave unit (information processing apparatus) 201) establish connection.

For example, the base station 100 and the slave units 200 and 201 can be formed each as a fixed or portable information processing apparatus having a wireless communication function. Here, the fixed information processing apparatus is an information processing apparatus such as an access point (AP) or a base station in a wireless LAN system. Meanwhile, the portable information processing apparatus is an information processing apparatus such as a smartphone, a portable telephone set or a tablet terminal.

Further, it is assumed that the base station 100 and the slave units 200 and 201 each have a communication function in compliance with a wireless LAN standard such as IEEE802.11. For example, each of them can have a communication function in compliance with a wireless LAN standard of IEEE802.11ax. Further, as the wireless LAN, for example, Wi-Fi, Wi-Fi Direct, Wi-Fi CERTIFIED Miracast specifications (technical specification name: Wi-Fi Display) can be used. Further, wireless communication that employs a different communication method may be performed.

For example, the communication system 10 can be formed as a network in which a plurality of apparatus are connected to each other by performing wireless communication by 1:1 wireless communication (for example, a mesh network or an ad hoc network). For example, the communication system 10 can be applied to a mesh network of IEEE802.11s.

Further, the communication system 10 can be formed, for example, as a network configured from an access point (master unit) and its subordinate apparatus (slave unit or units). In the embodiment of the present technology, an example of a case is depicted in which the base station 100 serves as an access point and the slave units 200 and 201 serve as subordinate apparatus to the access point (base station 100).

Further, in FIG. 1, an example of a communication path where different apparatus communicate directly with each other utilizing wireless communication is indicated by a dotted line connecting the different apparatus to each other.

It is to be noted that, while, in the embodiment of the present technology, operation of an apparatus of the transmission source (transmission side apparatus) and operation of an apparatus of the transmission destination (reception side apparatus) are described individually for the convenience of description, each of the apparatus may have functions of both of them incorporated therein or may have only one of the functions.

Further, the system configuration that is a target of the embodiment of the present technology is not limited to them. For example, while FIG. 1 depicts an example of a communication system that is configured from three information processing apparatus, the number of information processing apparatus is not limited to this. Also the connection scheme of a plurality of information processing apparatus is not limited to the connection schemes described above. For example, also to a network in which a plurality of apparatus are connected by a connection scheme different from the connection schemes described hereinabove, the embodiment of the present technology can be applied. For example, only if a communication system allows a certain information processing apparatus to communicate with a plurality of information processing apparatus connected to the certain information processing apparatus, the number of information processing apparatus is not limited to this.

Further, the embodiment of the present technology supposes a wireless LAN system based on IEEE802.11. Further, the embodiment of the present technology indicates an example in which one (slave unit 200) from among slave units that have established connection to the base station 100 is an information processing apparatus having a specific function. Further, in the embodiment of the present technology, another one (slave unit 201) of the slave units having established connection to the base station 100 is an information processing apparatus that does not include the specific function. The information processing apparatus that does not include the specific function can be referred to as, for example, legacy apparatus.

It is to be noted that, in the embodiment of the present technology, an example of a communication system configured from a base station and slave units is indicated. However, the base station is not limited to a base station having a master-slave relationship as a master unit with respect to a slave unit like an AP of IEEE802.11, but the base station may be a transmission source of a direct link by a plurality of slave units.

Further, in the embodiment of the present technology, an example of a case is described in which, in a situation in which the slave unit (legacy apparatus) 201 that does not have the specific function is connected to the base station 100 in the communication system 10, the base station 100 enters a function temporary pause state.

Here, the specific function signifies a function for understanding a frame transmitted from the base station 100 to each slave unit (a frame for the notification of a function temporary pause period) when at least some of functions of the base station 100 is to be temporarily paused.

Further, the function temporary pause period signifies a period within which at least some of functions provided for an information processing apparatus (for example, the base station 100 or the slave unit 200) is to be temporarily paused.

Further, in the description of the embodiment of the present technology, a function for temporarily pausing some of functions of an own apparatus is referred to as function temporary pause function. This function temporary pause function is, for example, a function provided to each slave unit and signifies a function for understanding that a base station enters a function temporary pause state and carrying out that also the own apparatus enters a function temporary pause state within the function temporary pause period of the base station. Further, in the embodiment of the present technology, it is assumed that a slave unit that includes the function temporary pause function has the specific function while a slave unit that does not have the function temporary pause function does not have the specific function. In other words, the slave unit 200 that has the function temporary pause function has the specific function, and the slave unit 201 that does not have the function temporary pause function does not have the specific function.

Further, the function temporary pause function information is information for the notification that the function temporary pause function is provided. Further, in the figures, the function temporary pause function information is denoted by Function Suspension Capability (FSC).

Further, the function temporary pause period information is information relating to a function temporary pause period. For example, the function temporary pause period information is information including a point of time at which a base station is to transition to a function temporary pause state and a period within which the base station is to be in the function temporary pause state. Alternatively, for example, the function temporary pause period information is information including a point of time at which a slave unit is to transition to a function temporary pause state and a period within which the slave unit is to be in the function temporary pause state. Further, in the figures, the function temporary pause period information is denoted by Function Suspension Period (FSP).

A transmission restraint direction is a direction (legacy station (L-STA) transmission restraint direction) for causing a slave unit (legacy apparatus) that does not have the function temporary pause function to restrain transmission. Further, in the figures, the transmission restraint direction is indicated by Legacy Transmission Restraint Direction (L-TRD).

A transmission restraint cancellation direction is a direction (L-STA transmission restraint cancellation direction) for causing, where a slave unit (legacy apparatus) that does not have the function temporary pause function is in a transmission restraint state, the slave unit to cancel the transmission restraint. Further, in the figures, the transmission restraint cancellation direction is indicated by Legacy Transmission Restraint Cancel Direction (L-TRCD).

In this manner, the function temporary pause state signifies a state in which at least some of functions of a base station is inactive. For example, the function temporary pause state can be a state in which the reception function the base state has is inactive (for example, a low power consumption state (for example, a Doze state)). However, it is supposed that, for example, even in a case in which the base station is in a low power consumption state in a relation to a slave unit connected thereto, the base station is performing some other operation. Further, it is supposed that, even in a case in which the base station is in a low power consumption state in a relation to a slave unit connected thereto, the base station is performing an operation of a group other than a group connected to the base station.

Further, even in a case in which the base station is in a low power consumption state in a relation to a slave unit connected thereto, it is supposed that the base station is performing a search of a group other than a group connected to the base station. Therefore, even in a case in which the base station is in a low power consumption state in a relation to a slave unit connected thereto, a state in a case in which the base station is not in a low power consumption state in a relation to other apparatus than the slave unit connected thereto is included in the function temporary pause state. This similarly applies also to the function temporary pause state of each slave unit.

For example, a temporary pause of the base station 100 can be a temporary pause for allowing the base station 100 to enter a power saving state. Further, for example, the temporary pause of the base station 100 can be a temporary pause of any other function than the function for temporarily pausing the functions of the group to which the base station 100 belongs while allowing the functions of any other group than the group to be carried out. Further, the temporary pause of the base station 100 can be a temporary pause of any other function than the function for temporarily pausing the functions of the group to which the base station 100 belongs while allowing a new group, to which the base station 100 is to belong, to be searched. Further, the temporary pause of the base station 100 can be a combination of plural ones of the temporary pauses.

Further, in the first embodiment of the present technology, an example is indicated in which the base station 100 causes the slave unit 200 to enter a function temporary pause state using a notification method that can be understood only by the slave unit 200 while it causes the slave unit 201 to restrain transmission and then the base station 100 enters a function temporary pause state. Further, an example is depicted in which, in order to carry out a function as a base station only for the slave unit 201 after the base station 100 enters a function temporary pause state, the base station 100 cancels the function temporary pause state of itself and causes the slave unit 201 to cancel its transmission restraint.

On the other hand, in the second embodiment of the present technology, an example is indicated in which, within a period within which the slave unit 200 remains in a function temporary pause state, the base station 100 sets a period for carrying out a function as a base station only for the slave unit 201.

(Example of Functional Configuration of Base Station (Information Processing Apparatus))

Figure 2:
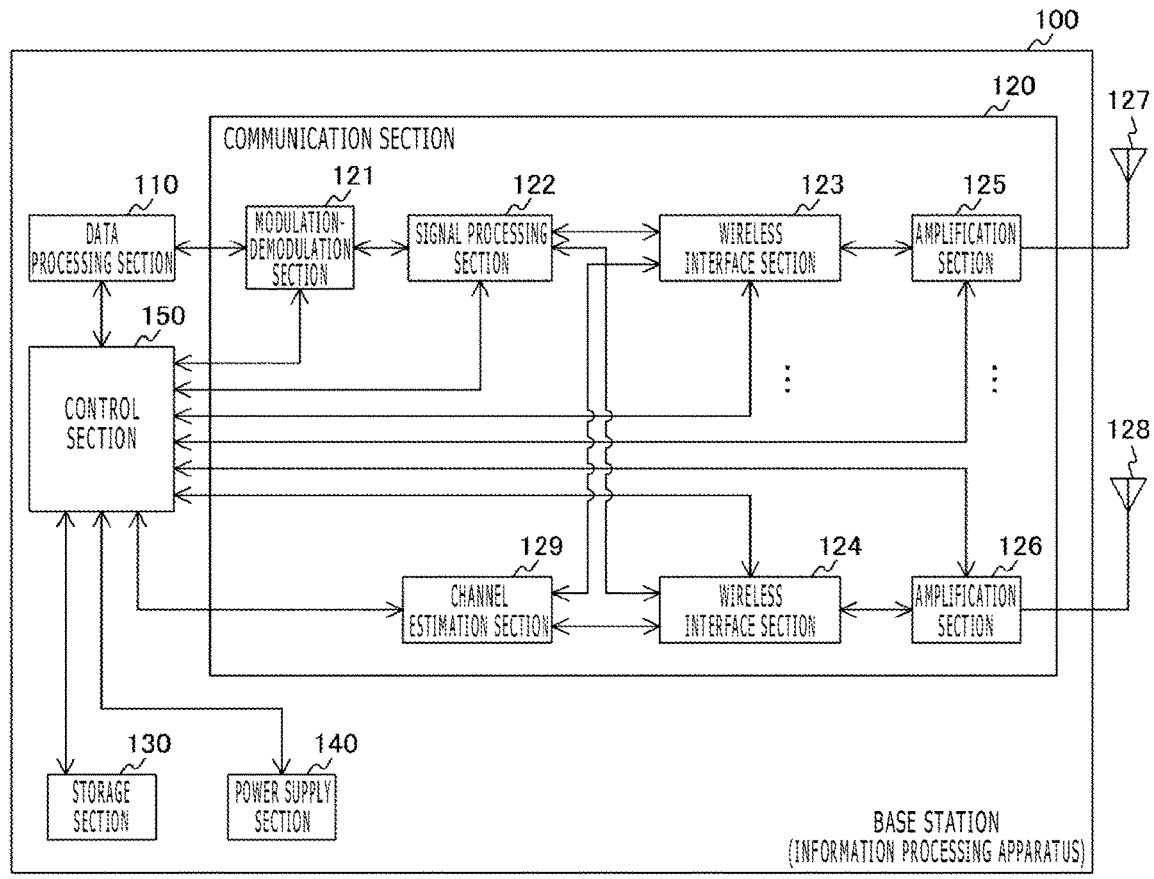
FIG. 2 is a block diagram depicting an example of a functional configuration of a base station 100 in the first embodiment of the present technology.

FIG. 2 is a block diagram depicting an example of a functional configuration of the base station 100 in the first embodiment of the present technology. It is to be noted that the slave unit 200 and the slave unit 201 have a functional configuration (configuration relating to wireless communication) substantially similar to the functional configuration of the base station 100. Therefore, description of the functional configuration of the slave unit 200 and the slave unit 201 is omitted.

The base station 100 includes a data processing section 110, a communication section 120, a storage section 130, a power supply section 140 and a control section 150. Further, the communication section 120 includes a modulation-demodulation section 121, a signal processing section 122, wireless interface sections 123 and 124, amplification sections 125 and 126, antennae 127 and 128 and a channel estimation section 129.

The data processing section 110 processes various kinds of data under the control of the control section 150. For example, upon transmission when data is inputted from an upper layer, the data processing section 110 generates a packet for wireless transmission from the data. Then, the data processing section 110 executes such processes as addition of a header and addition of an error detection code for media access control (MAC), and provides data after the processes to the modulation-demodulation section 121. On the other hand, for example, upon reception when an input from the modulation-demodulation section 121 is received, the data processing section 110 carries out analysis of a MAC header, detection of a packet error, a reorder process and so forth and provides data after the processes to a protocol upper layer of the own apparatus. Further, for example, the data processing section 110 notifies the control section 150 of an analysis result of a header, a detection result of a packet error and so forth.

The modulation-demodulation section 121 performs a modulation-demodulation process under the control of the control section 150. For example, upon transmission, the modulation-demodulation section 121 performs, encoding, interleaving and modulation for input data from the data processing section 110 on the basis of coding and modulation methods set by the control section 150. Then, the modulation-demodulation section 121 generates a data symbol stream and provides the data symbol stream to the signal processing section 122. On the other hand, for example, upon reception, the modulation-demodulation section 121 performs processes reverse to those upon transmission for an input form the signal processing section 122 and provides data to the data processing section 110 or the control section 150.

The signal processing section 122 performs various signal processes under the control of the control section 150. For example, upon transmission, the signal processing section 122 performs a signal process (spatial signal process) used for spatial separation for an input from the modulation-demodulation section 121 as occasion demands and provides one or more transmission symbol streams obtained by the process to the wireless interface sections 123 and 124. Further, for example, upon reception, the signal processing section 122 performs a signal process for a reception symbol stream inputted from the wireless interface section 123 or 124, performs spatial resolution of the stream as occasion demands, and supplies a result of the spatial resolution to the modulation-demodulation section 121.

Each of the wireless interface sections 123 and 124 is an interface for establishing connection to a different information processing apparatus utilizing wireless communication to transmit and receive various kinds of information. For example, upon transmission, each of the wireless interface sections 123 and 124 converts an input from the signal processing section 122 into an analog signal and carries out filtering and up conversion into a carrier frequency. Then, the each of the wireless interface sections 123 and 124 sends out the analog signal to the antenna 127 or 128 through the amplification section 125 or 126. On the other hand, for example, upon reception, each of the wireless interface sections 123 and 124 carries out reverse processes to an input from any of the antennae 127 and 128 and the amplification sections 125 and 126 and provides resulting data to the signal processing section 122 and the channel estimation section 129.

The amplification sections 125 and 126 are amplifiers for amplifying an analog signal to predetermined power. For example, upon transmission, each of the amplification sections 125 and 126 amplifies an analog signal inputted from the wireless interface section 123 or 124 to predetermined power such that the analog signal is sent out from the antenna 127 or 128. On the other hand, for example, upon reception, each of the amplification sections 125 and 126 amplifies a signal inputted from the antenna 127 or 128 to predetermined power and outputs the amplified signal to the wireless interface section 123 or 124.

It is to be noted that the amplification sections 125 and 126 and the wireless interface sections 123 and 124 are depicted in different configurations from each other in FIG. 2. However, the amplification sections 125 and 126 may be configured such that at least one of a function upon transmission and a function upon reception is included in the wireless interface sections 123 and 124.

Further, in FIG. 2, an example of a case is depicted in which a plurality of combinations exist each of which includes the wireless interface section 123, amplification section 125 and antenna 127 that form one set and the wireless interface section 124, amplification section 126 and antenna 128 that form one set. However, as regards the wireless interface section, amplification section and antenna section, only one set may be provided as a component.

The channel estimation section 129 calculates complex channel gain information of a transmission path from a preamble part and a training signal part from within an input signal from each of the wireless interface sections 123 and 124. Then, the calculated complex channel gain information is utilized in a demodulation process by the modulation-demodulation section 121 and a spatial process by the signal processing section 122 through the control section 150.

The storage section 130 has a role as a working area for a data process by the control section 150 and a function as a storage medium for retaining various kinds of data. As the storage section 130, a storage medium such as a nonvolatile memory, a magnetic disk, an optical disk, or a magneto optical (MO) disk can be used. It is to be noted that, as a nonvolatile memory, for example, an electrically erasable programmable read-only memory (EEPROM) or an erasable programmable ROM (EPROM) can be used. Further, as a magnetic disk, for example, a hard disk or a disk type magnetic disk can be used. Further, as an optical disk, for example, a compact disc (CD), a digital versatile disc recordable (DVD-R) or a Blu-Ray (registered trademark) disc (BD) can be used.

The power supply section 140 supplies electric power to the components of the base station 100 under the control of the control section 150. For example, where the base station 100 is a fixed type apparatus, the power supply section 140 is configured from a fixed power supply. On the other hand, for example, where the base station 100 is a portable type apparatus (for example, a mobile apparatus), the power supply section 140 is configured from a battery power supply.

The control section 150 controls reception operation and transmission operation of the components of the base station 100 on the basis of a control program. For example, the control section 150 performs passing of information between the components of the base station 100. Further, for example, the control section 150 performs parameter setting for the modulation-demodulation section 121 and the signal processing section 122 and scheduling of packets for the data processing section 110. Further, for example, the control section 150 performs parameter setting and transmission power control for the wireless interface sections 123 and 124 and the amplification sections 125 and 126.

Further, the control section 150 performs a process for causing the base station 100 to determine a point of time at and a period for which the function as a base station is to enter and keep a temporary pause state. In this case, the data processing section 110 incorporates the information into data.

Further, the control section 150 performs a process for causing the base station 100 to determine a point of time at and a period for which the function of a slave unit that has the specific function is to enter and keep a temporary pause state. In this case, the data processing section 110 incorporates the information into data.

Further, the control section 150 performs a process for causing the base station 100 to determine a point of time at and a period for which the function of a slave unit that does not have the specific function is to enter and keep a temporary pause state. In this case, the data processing section 110 incorporates the information into data.

Further, the control section of the slave unit 200 (corresponding to the control section 150) performs a process for determining a notification regarding a pause period to which the slave unit 200 corresponds and performs a process for determining a point of time at and a period for which the slave unit 200 is to enter and keep a function temporary pause state as a slave unit. In this case, the data processing section of the slave unit 200 (corresponding to the data processing section 110) incorporates the determined information into data.

For example, when the control section 150 is to temporarily pause at least some of functions (for example, a function as a base station) of the base station 100, it performs control for notifying the slave unit 200, which has the specific function, of a function temporary pause period within which at least some of functions of the slave unit 200 is to be temporarily paused. Further, for example, when the control section 150 is to temporarily pause at least some of functions of the base station 100, it performs control for directing the slave unit 201, which does not have the specific function, to restrain transmission. This specific function is a function capable of understanding a frame for the notification of a function temporary pause period as described hereinabove.

Further, for example, the control section 150 can direct the slave unit 201 to restrain transmission after a point of time at which a function temporary pause period for the slave unit 200 is started. Further, for example, the control section 150 can set a period of time longer than the temporary pause period of the base station 100 as a function temporary pause period for the slave unit 200. Further, for example, the control section 150 can transmit a frame (depicted in FIG. 4), which includes a function temporary pause period for the slave unit 200 and a start timing of the function temporary pause period, as a frame for the notification of the function temporary pause period to the slave unit 200.

Further, for example, when the control section 150 temporarily carries out a function as a base station within a period within which the function as a base station is temporarily paused, the control section 150 can perform transmission restraint cancellation direction to the slave unit 201 and direct, after it performs the temporary carrying out with the slave unit 201, the slave unit 201 to restrain transmission again. In this case, the control section 150 can set at least one or more periods, within which a function as a base station is to be carried out temporarily, within the function temporary pause period of the slave unit 200.

Further, for example, the control section of the slave unit 200 (corresponding to the control section 150) can perform control for setting a period within which at least some of functions of the slave unit 200 is to be temporarily paused on the basis of the function temporary pause period notified from the base station 100. In this case, the control section of the slave unit 200 performs control for notifying the base station 100 in advance that the slave unit 200 has the specific function for understanding a frame for the notification of a function temporary pause period.

(Example of Configuration of Frame for Notification of Function Temporary Pause Function)

Figure 3:
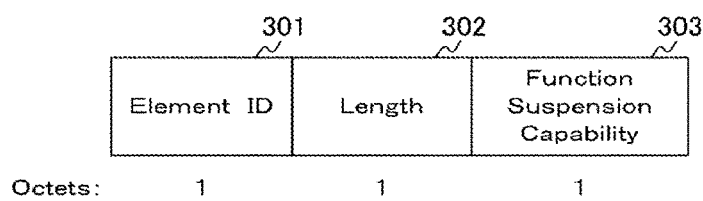
FIG. 3 is a view depicting an example of a configuration of a frame that is used when a notification of a function temporary pause function is issued from a slave unit 200 to the base station 100 in the first embodiment of the present technology.

FIG. 3 is a view depicting an example of a configuration of a frame used when the slave unit 200 notifies the base station 100 of a function temporary pause function in the first embodiment of the present technology. FIG. 3 depicts an example in which an information element (IE) for the notification that a function temporary pause function is provided is used.

The IE includes an ELEMENT ID 301, a Length 302 and a Function Suspension Capability 303. It is to be noted that, in FIG. 3, a numerical value representative of Octets of each field is indicated at the lower side of each field.

In the ELEMENT ID 301, an ID indicating that the IE is an IE for the notification that a function temporary pause function is provided.

In the Length 302, information indicative of a length of data of the IE is stored.

The Function Suspension Capability 303 is a field for storing function temporary pause function information. Thus, function temporary pause function information is stored in the Function Suspension Capability 303.

The slave unit 200 can place and transmit to the base station 100, for example, the IE depicted in FIG. 3 into and together with one of frames (A1) to (A6) given below. In particular, the slave unit 200 can notify the base station 100 of function temporary pause function information using one of the following frames (A1) to (A6):

(A1) Association Request frame defined by IEEE Std 802.11(TM)-2012

(A2) Reassociation Request frame defined by IEEE Std 802.11(TM)-2012

(A3) Probe Request frame defined by IEEE Std 802.11 (TM)-2012

(A4) Action frame defined by IEEE Std 802.11(TM)-2012

(A5) Action No Ack frame defined by IEEE Std 802.11 (TM)-2012

(A6) New frame not defined by IEEE Std 802.11(TM)-2012

(Example of Configuration of Frame for Notification of Function Temporary Pause Period)

Figure 4:
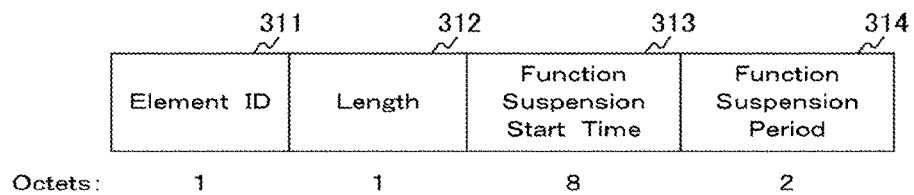
FIG. 4 is a view depicting an example of a configuration of a frame that is used when a notification of a function temporary pause period is issued from the base station 100 to the slave unit 200 in the first embodiment of the present technology.

FIG. 4 is a view depicting an example of a configuration of a frame that is used when the base station 100 notifies the slave unit 200 of a function temporary pause period in the first embodiment of the present technology. In FIG. 4, an example in which an IE for notifying of a function temporary pause period is used is depicted.

The IE includes an ELEMENT ID 311, a Length 312, a Function Suspension Start Time 313 and a Function Suspension Period 314. It is to be noted that, in FIG. 4, a numerical value representative of Octets of each field is indicated at the lower side of each field.

In the ELEMENT ID 311, an ID indicating that the IE is an IE for the notification of a function temporary pause period is stored.

In the Length 312, information indicative of a length of data of the IE is stored.

In the Function Suspension Start Time 313, information regarding a starting point of time of the function temporary pause period is stored.

In the Function Suspension Period 314, function temporary pause period information is stored.

The base station 100 can place and transmit to the slave unit 200, for example, the IE depicted in FIG. 4 into and together with one of frames (B1) to (B7) given below. In other words, the base station 100 can notify the slave unit 200 of a function temporary pause period using one of the following frames (B1) to (B7):

(B1) Beacon frame defined by IEEE Std 802.11(TM)-2012

(B2) Association Response frame defined by IEEE Std 802.11(TM)-2012

(B3) Reassociation Response frame defined by IEEE Std 802.11(TM)-2012

(B4) Probe Response frame defined by IEEE Std 802.11(TM)-2012

(B5) Action frame defined by IEEE Std 802.11(TM)-2012

(B6) Action No Ack frame defined by IEEE Std 802.11(TM)-2012

(B7) New frame not defined by IEEE Std 802.11(TM)-2012

For example, the base station 100 confirms in advance whether or not the slave unit 200 and the slave unit 201 each have the function temporary pause function. For example, the base station 100 can confirm in advance that the slave unit 200 has the function temporary pause function by receiving the IE depicted in FIG. 3 transmitted from the slave unit 200. On the other hand, for example, the base station 100 can confirm in advance that the slave unit 201 does not have the function temporary pause function because it does not receive transmission of the IE depicted in FIG. 3 from the slave unit 201.

Here, exchange of the IE depicted in FIG. 3 can be performed at timings at which exchange of some information is performed between the base station 100 and the slave unit 200. For example, when the Capability is exchanged by Handshake, exchange of the IE depicted in FIG. 3 can be performed.

In this manner, the base station 100 uses the IE depicted in FIG. 3 to confirm whether or not the slave unit 200 and the slave unit 201 each have the function temporary pause function, and manages results of the confirmation. For example, the base station 100 can store the confirmation results into the storage section 130 and manage them. Further, as described hereinabove, a slave unit that has the function temporary pause function has the specific function, and a slave unit that does not have the function temporary pause function does not have the specific function.

(Example of Notification of Transmission Restraint Direction and Transmission Restraint Cancellation Direction)

Here, the base station 100 notifies an apparatus that does not have the function temporary pause function (slave unit 201) of a transmission restraint direction and a transmission restraint cancellation direction. The base station 100 can notify the slave unit 201 of the transmission restraint direction, for example, using one of the following frames (C1) and (C2):

(C1) CTS frame that is defined by IEEE Std 802.11(TM)-2012 and is a frame whose receiver address (RA) is the address of a transmission source (base station 100)

(C2) Control frame that is defined by IEEE Std 802.11(TM)-2012 and is a frame whose RA is the address of a transmission source (base station 100)

Further, the base station 100 can notify the slave unit 201 of the transmission restraint cancellation direction, for example, using one of the following frames (D1) and (D2):

(D1) CF-End frame defined by IEEE Std 802.11(TM)-2012

(D2) CF-End+Cf-Ack frame defined by IEEE Std 802.11(TM)-2012

(Example of Setting of Function Temporary Pause State and Transmission Restraint State)

Figure 5:
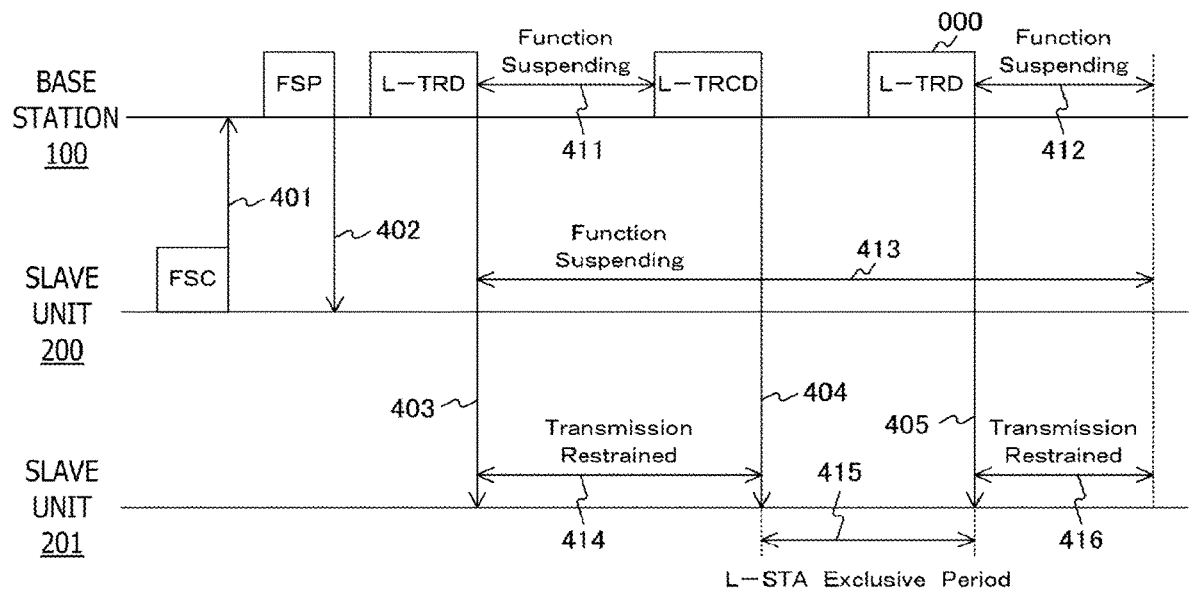
FIG. 5 is a view schematically depicting data exchanged between different apparatus and periods of a function temporary pause state and a transmission restraint state of the individual apparatus in the first embodiment of the present technology.

FIG. 5 is a view schematically depicting data exchanged between different apparatus and periods of a function temporary pause state and a transmission restraint state of the individual apparatus in the first embodiment of the present technology. Further, the axis of abscissa depicted in FIG. 5 indicates a time axis. Further, data transmitted from each apparatus is schematically depicted by a rectangle on each time axis. This similarly applies also to FIGS. 6 to 9, 13 and 14.

Further, FIG. 5 depicts an example in which the period within which the slave unit 200 enters a function temporary pause state and the period notified by a first transmission restraint direction within which the slave unit 201 enters a transmission restraint state are equal to each other. Further, in FIG. 5, in accordance with a transmission restraint cancellation direction, actual transmission restraint state is exhibited within only part of the period notified by the first transmission restraint direction within which the slave unit 201 enters a transmission restraint state.

First, the slave unit 200 transmits a frame including function temporary pause function information to the base station 100 (401). The slave unit 200 may perform the notification of the function temporary pause function information spontaneously or in response to a trigger from the base station 100. Alternatively, upon confirmation of Capability upon Association in advance, the slave unit 200 may notify the base station 100 of the function temporary pause function information.

By exchange of the function temporary pause function information, the base station 100 can decide whether or not each of the slave units connected to the own apparatus has the function temporary pause function. In particular, the base station 100 decides that the slave unit 200 from which the function temporary pause function information is transmitted has the function temporary pause function, but decides that the slave unit 201 that does not transmit its function temporary pause function information does not have the function temporary pause function.

Then, the base station 100 transmits a frame including the function temporary pause period information to the slave unit 200 (402). Here, if a plurality of slave units are connected to the base station 100, the base station 100 may transmit a frame including the function temporary pause period information individually to each of the slave units or may transmit the frame collectively to all slave units.

The slave unit 200 receiving the function temporary pause period information enters a function temporary pause state on the basis of the received function temporary pause period information (413). In particular, the slave unit 200 enters a function temporary pause state at an entering point of time included in the received function temporary pause period information and maintains the state for an entering period included in the received function temporary pause period information (413).

Further, after the base station 100 transmits a frame including the function temporary pause period information to the slave unit 200 (402), it transmits a frame including a transmission restraint direction to the slave unit 201 (403). After the transmission of this frame, the base station 100 enters a function temporary pause state (411). Further, it is assumed that also the slave unit 200 enters a function temporary pause state (413).

The slave unit 201 receiving the frame including the transmission restraint direction immediately enters a transmission restraint state (414). Then, the slave unit 201 maintains the transmission restraint state for an entering period included in the frame (414).

Further, the slave unit 200 that is in the function temporary pause state ignores the frame including the transmission restraint direction (403).

Further, the period within which the slave unit 200 enters a function temporary pause state and the period notified by the first transmission restraint direction within which the slave unit 201 enters a transmission restraint state are equal to each other.

In particular, the point of time at which the slave unit 200 cancels the function temporary pause state and the point of time at which the slave unit 201 cancels the transmission restraint state are the same as each other if they are based only on the function temporary pause period information and the transmission restraint direction.

Here, unlike entering of the slave unit 200 into a function temporary pause state, the transmission restraint for the slave unit 201 is carried out without preparations in advance by the slave unit 201. Therefore, if the base station 100 issues a direction to restrain transmission, there is the possibility that packet discarding or the like by transmission restraint, which is not supposed by the slave unit 201, may occur. Therefore, after the base station 100 issues a transmission restraint direction to the slave unit 201, it temporarily cancels the transmission restraint for the slave unit 201. In particular, after the base station 100 issues a transmission restraint direction to the slave unit 201, it sets a period within which only the slave unit 201 is communicatable (legacy-dedicated period). Consequently, packet discarding and so forth by the transmission restraint can be reduced.

Therefore, in FIG. 5, within a period within which the base station 100 and the slave unit 200 are in a function temporary pause state and the slave unit 201 is in a transmission restraint state, the base station 100 cancels the function temporary pause state of the own apparatus. In particular, after the base station 100 cancels the function temporary pause state of the own apparatus, it transmits a frame for cancelling the transmission restraint state of the slave unit 201 (404).

In the meantime, the slave unit 200 that is in a function temporary pause state ignores the frame that includes the transmission restraint cancellation direction.

Consequently, the slave unit 201 can cancel transmission restraint in a state in which the function temporary pause state of the slave unit 200 is maintained (415). In this manner, the base station 100 can carry out its function as a base station only for the slave unit 201 (415). In other words, the base station 100 sets a period within which only the slave unit 201 is communicatable (legacy-dedicated period 415).

After transmission restraint of the slave unit 201 is cancelled, the base station 100 transmits a frame including a new transmission restraint direction to the slave unit 201 (405). Consequently, the slave unit 201 enters a transmission restraint state (416).

Further, the slave unit 201 receiving the new transmission restraint direction immediately enters a transmission restraint state and maintains the transmission restraint state for an entering period included in the information (416).

This new transmission restraint direction has a period set therein such that the transmission restraint state is cancelled at a point of time same as a point of time at which the transmission restraint state is cancelled which point of time can be calculated from the transmission restraint direction in the preceding operation cycle.

Figure 6:
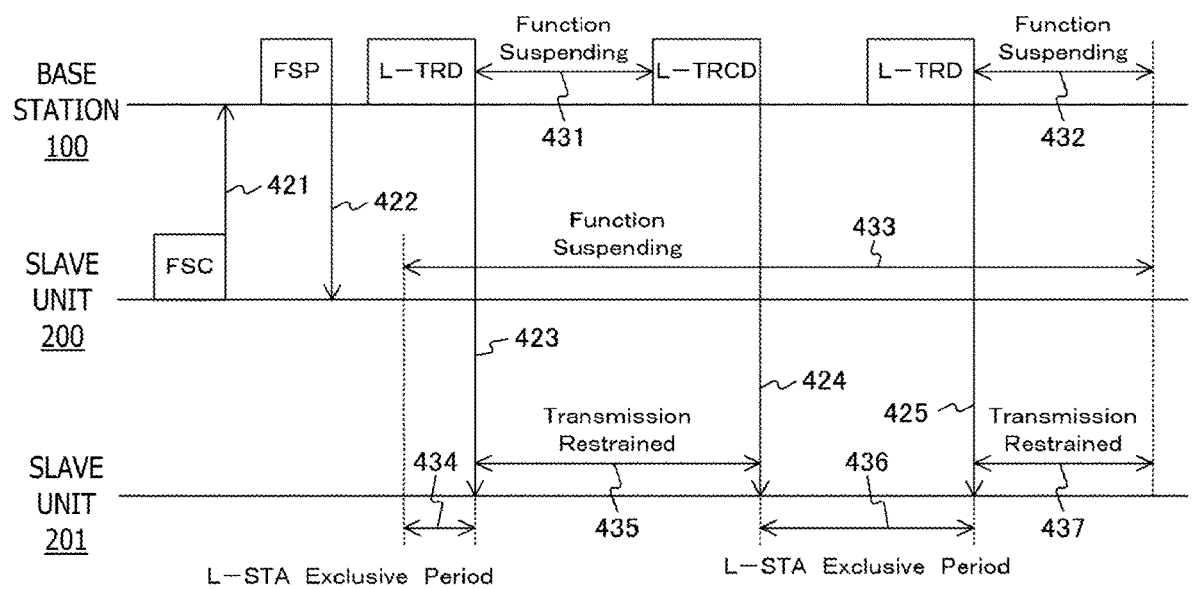
FIG. 6 is a view schematically depicting data exchanged between different apparatus and periods of a function temporary pause state and a transmission restraint state of the individual apparatus in the first embodiment of the present technology.
Figure 7:
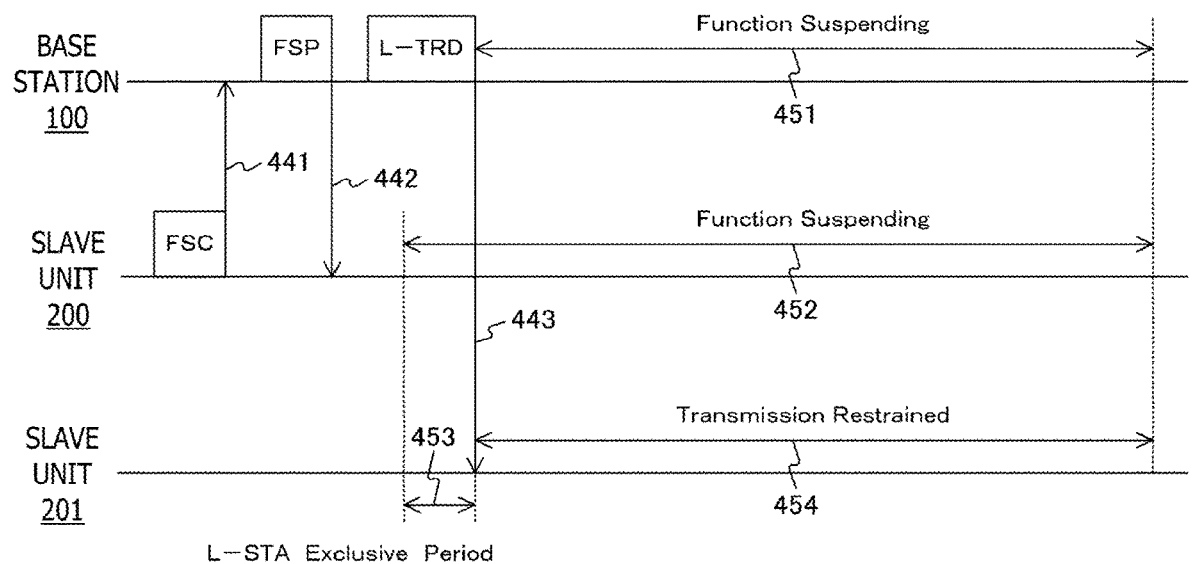
FIG. 7 is a view schematically depicting data exchanged between different apparatus and periods of a function temporary pause state and a transmission restraint state of the individual apparatus in the first embodiment of the present technology.
Figure 8:
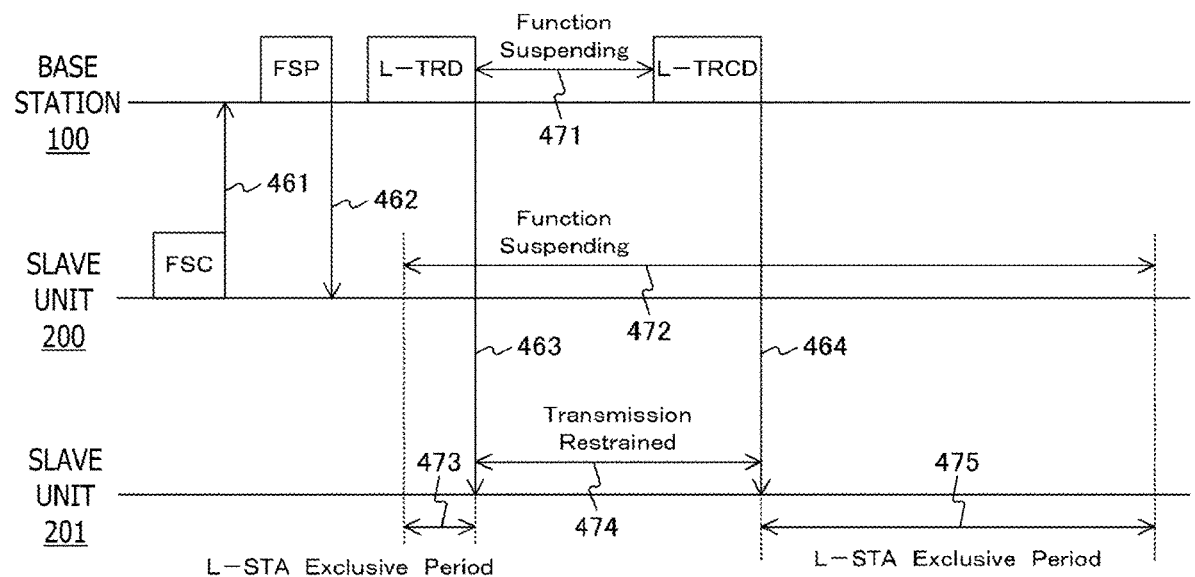
FIG. 8 is a view schematically depicting data exchanged between different apparatus and periods of a function temporary pause state and a transmission restraint state of the individual apparatus in the first embodiment of the present technology.
Figure 9:
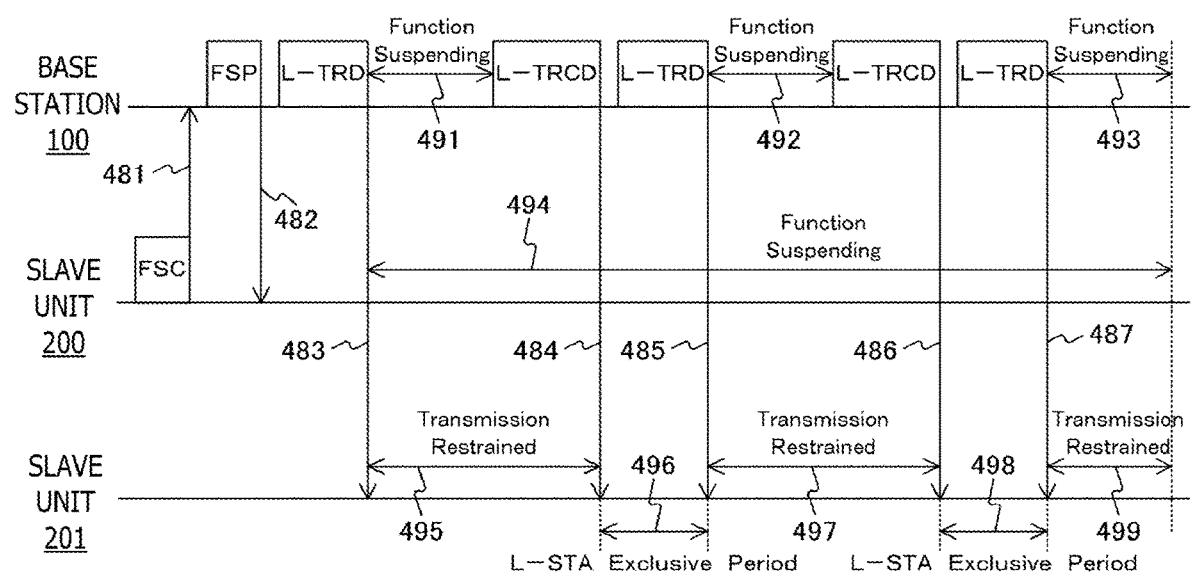
FIG. 9 is a view schematically depicting data exchanged between different apparatus and periods of a function temporary pause state and a transmission restraint state of the individual apparatus in the first embodiment of the present technology.

In this manner, FIG. 5 depicts an example in which a period (legacy-dedicated period 415) within which the base station 100 can carry out a function as a base station only for the slave unit 201 is set. Meanwhile, modifications to the legacy-dedicated period to be set are depicted in FIGS. 6 to 8. Further, an example in which a plurality of legacy-dedicated periods are set is depicted in FIG. 9.

Further, with which length a legacy-dedicated period is set or whether a plurality of legacy-dedicated periods are to be set may be determined suitably. For example, such setting can be determined on the basis of the number of slave units connected to the base station, the number (or the ratio) of legacy apparatus included in the slave units connected to the base station, traffic handled by each slave unit and so forth. Such criteria and so forth are described in detail in connection with a second embodiment of the present technology.
(Example of Setting of Function Temporary Pause State and Transmission Restraint State)

FIG. 6 is a view schematically depicting data exchanged between different apparatus and periods of a function temporary pause state and a transmission restraint state of the individual apparatus in the first embodiment of the present technology.

The example depicted in FIG. 6 is a modification to the example of FIG. 5 and indicates an example of a case in which the points of time at which the base station 100 and the slave unit 200 individually enter a function temporary pause state are different from each other. It is to be noted that, except this, the example of FIG. 6 is the same as the example of FIG. 5, and therefore, part of description of the same portions as those in FIG. 5 is omitted.

In particular, transmission of frames depicted in FIGS. 6 (421 to 425) corresponds to transmission of the frames depicted in FIGS. 5 (401 to 405). However, the function temporary pause period information included in the frame transmitted from the base station 100 to the slave unit 200 is different from that in FIG. 5.

In particular, in FIG. 6, a point of time at which the slave unit 200 enters a function temporary pause state is set earlier than a point of time at which the base station 100 enters a function temporary pause state and a point of time at which the slave unit 201 enters a transmission restraint state (433). It is to be noted that it is assumed that the other periods (431, 432 and 435 to 437) are similar to those in FIG. 5.

In this manner, the point of time at which the slave unit 200 enters a function temporary pause state is set earlier than the point of time at which the base station 100 enters a function temporary pause state and the point of time at which the slave unit 201 enters a transmission restraint state (433). Consequently, it is possible to provide a period (434) within which the base station 100 carries out a function as a base station only for the slave unit 201. In particular, the base station 100 sets a period within which only the slave unit 201 is communicatable (legacy-dedicated periods 434 and 436).

Further, the base station 100 sets a period within which the slave unit 200 is in a function temporary pause state and a period within which the slave unit 201 is in a transmission restraint state such that the point of time at which the slave unit 200 cancels the function temporary pause state and the point of time at which the slave unit 201 cancels the transmission restraint state may be the same as each other.

In this manner, a plurality of legacy-dedicated periods (434 and 436) within which the base station 100 can carry out a function as a base station only for the slave unit 201 can be set at the beginning and the middle of the period within which the slave unit 200 is in a function temporary pause state.

(Example of Setting of Function Temporary Pause State and Transmission Restraint State)

FIG. 7 is a view schematically depicting data exchanged between different apparatus and periods of a function temporary pause state and a transmission restraint state of the individual apparatus in the first embodiment of the present technology.

The example depicted in FIG. 7 is a modification to the example of FIG. 6 and indicates an example in which a legacy-dedicated period within which the base station 100 can carry out a function as a base station only for the slave unit 201 is set only at the beginning of a period within which the slave unit 200 is in a function temporary pause state. It is to be noted that, except this, the example of FIG. 7 is the same as the example of FIG. 6, and therefore, part of description of the same portions as those in FIG. 6 is omitted.

In particular, transmission of frames depicted in FIGS. 7 (441 to 443) corresponds to transmission of the frames depicted in FIGS. 6 (421 to 423). Further, FIG. 7 is different from FIG. 6 in that the base station 100 does not transmit a transmission restraint cancellation direction and a new transmission restraint direction to the slave unit 201.

Further, in FIG. 7, a period (452) within which the slave unit 200 is in a function temporary pause state and a period (454) within which the slave unit 201 is in a transmission restraint state are set such that the point of time at which the slave unit 200 cancels the function temporary pause state and the point of time at which the slave unit 201 cancels the transmission restraint state are the same as each other. Further, it is assumed that a period (451) within which the base station 100 is in a function temporary pause state is the same as the period (454) within which the slave unit 201 is in a transmission restraint state.

In this manner, a legacy-dedicated period (453) within which the base station 100 can carry out a function as a base station only for the slave unit 201 can be set at the beginning of a period within which the slave unit 200 is in a function temporary pause state.

(Example of Setting of Function Temporary Pause State and Transmission Restraint State)

FIG. 8 is a view schematically depicting data exchanged between different apparatus and periods of a function temporary pause state and a transmission restraint state of the individual apparatus in the first embodiment of the present technology.

The example depicted in FIG. 8 is a modification to the example of FIG. 6 and indicates an example in which a plurality of legacy-dedicated periods within which the base station 100 can carry out a function as a base station only for the slave unit 201 are set at the beginning and the end of a period within which the slave unit 200 is in a function temporary pause state. It is to be noted that, except this, the example of FIG. 8 is the same as the example of FIG. 6, and therefore, part of description of the same portions as those in FIG. 6 is omitted.

In particular, transmission of frames depicted in FIGS. 8 (461 to 464) corresponds to transmission of the frames depicted in FIGS. 6 (421 to 424). Further, FIG. 8 is different from FIG. 6 in that the base station 100 does not transmit a new transmission restraint direction to the slave unit 201.

Further, in FIG. 8, a period (472) within which the slave unit 200 is in a function temporary pause state and a period within which the slave unit 201 is in a transmission restraint state are set such that the point of time at which the slave unit 200 cancels the function temporary pause state and the point of time notified by the first transmission restraint direction at which the slave unit 201 cancels the transmission restraint state are the same as each other. Further, in FIG. 8, in accordance with a transmission restraint cancellation direction, actual transmission restraint state is exhibited within part (473 and 475) of the period notified by the first transmission restraint direction within which the slave unit 201 enters a transmission restraint state.

In this manner, a plurality of legacy-dedicated periods (473 and 475) within which the base station 100 can carry out a function as a base station only for the slave unit 201 can be set at the beginning and the end of a period within which the slave unit 200 is in a function temporary pause state.

(Example of Setting of Function Temporary Pause State and Transmission Restraint State)

FIG. 9 is a view schematically depicting data exchanged between different apparatus and periods of a function temporary pause state and a transmission restraint state of the individual apparatus in the first embodiment of the present technology.

The example depicted in FIG. 9 is a modification to the example of FIG. 5 and indicates an example in which a plurality of legacy-dedicated periods within which the base station 100 can carry out a function as a base station only for the slave unit 201 are set within a period within which the slave unit 200 is in a function temporary pause state. It is to be noted that, except this, the example of FIG. 9 is the same as the example of FIG. 5, and therefore, part of description of the same portions as those in FIG. 5 is omitted.

In particular, transmission of frames depicted in FIGS. 9 (481 to 483) corresponds to transmission of the frames depicted in FIGS. 5 (401 to 403). Further, transmission of frames (484 to 487) depicted in FIG. 9 corresponds to transmission of the frames (404 and 405) depicted in FIG. 5. However, FIG. 9 is different from FIG. 5 in that the base station 100 transmits a transmission restraint cancellation direction and a new transmission restraint direction to the slave unit 201 twice.

Further, it is assumed that the period (including a legacy-dedicated period) within which the base station 100 is in a function temporary pause state is the same as the period notified by the first transmission restraint direction within which the slave unit 201 is in a transmission restraint state.

Further, FIG. 9 depicts an example in which the period within which the slave unit 200 enters a function temporary pause state and the period notified by the first transmission restraint direction within which the slave unit 201 enters a transmission restraint state are the same as each other.

In other words, the point of time at which the slave unit 200 cancels the function temporary pause state and the point of time at which the slave unit 201 cancels the transmission restraint state are the same as each other if they are based only on the first function temporary pause period information and the transmission restraint direction.

Further, within a period within which the base station 100 and the slave unit 200 are in a function temporary pause state and the slave unit 201 is in a transmission restraint state, the base station 100 cancels the function temporary pause state of the own apparatus and transmits a frame for cancelling the transmission restraint state of the slave unit 201 (484). Further, the base station 100 transmits a new transmission restraint direction to the slave unit 201 (485). Further, the base station 100 repetitively transmits a transmission restraint cancellation direction and a new transmission restraint direction again to the slave unit 201 (486 and 487).

In this manner, a plurality of legacy-dedicated periods (496 and 498) within which the base station 100 can carry out a function as a base station only for the slave unit 201 can be set within a period within which the slave unit 200 is in a function temporary pause state.

(Example of Operation of Base Station)

Figure 10:
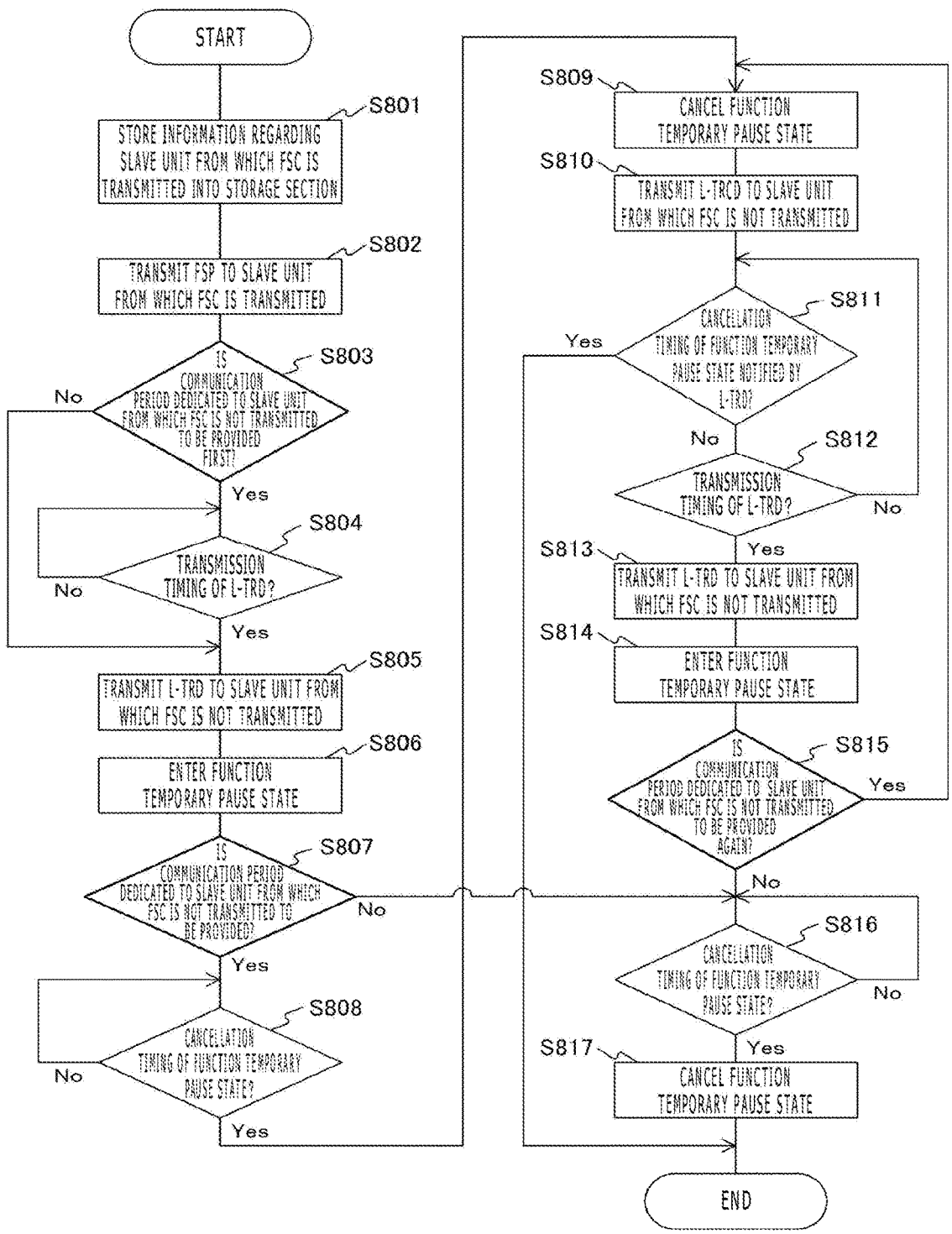
FIG. 10 is a flow chart depicting an example of a processing procedure of a setting process of a function temporary pause state and a transmission restraint state by the base station 100 in the first embodiment of the present technology.

FIG. 10 is a flow chart depicting an example of a processing procedure of a setting process of a function temporary pause state and a transmission restraint state by the base station 100 in the first embodiment of the present technology.

First, the control section 150 of the base station 100 stores, on the basis of received function temporary pause function information (FSC), information regarding the slave unit from which the FSC is transmitted into the storage section 130 (step S801). Here, the information regarding the slave unit is, for example, an identifier of the slave unit, Capability information of the slave unit, checkmark information relating to the FSC and so forth. For example, checkmark information relating to the FSC can be stored by applying a checkmark to the FSC for management information stored in the base station 100 (for example, Capability management information of the slave units connected to the base station 100).

Then, the control section 150 of the base station 100 performs a transmission process for transmitting function temporary pause period information (FSP) to the slave unit from which the function temporary pause function information is transmitted (step S802).

Then, the control section 150 of the base station 100 decides whether or not it is set to first provide a dedicated communication period (legacy-dedicated period) to a slave unit (legacy apparatus) from which function temporary pause function information is not transmitted (step S803). The legacy-dedicated period provided first is, for example, the period 434, 453 or 473 depicted in FIGS. 6 to 8, respectively. If it is not set that a legacy-dedicated period is provided first (step S803), then the processing advances to step S805.

If it is set that a legacy-dedicated period is provided first (step S803), then the control section 150 of the base station 100 decides whether or not it is a transmission timing for a transmission restraint direction for a legacy apparatus (step S804). If it is not a transmission timing for a transmission restraint direction for a legacy apparatus (step S804), then the control section 150 of the base station 100 waits until the transmission timing comes.

If it is a transmission timing for a transmission restraint direction for a legacy apparatus (step S804), then the control section 150 of the base station 100 performs a transmission process for transmitting a transmission restraint direction (L-TRD) for a legacy apparatus to the slave unit from which function temporary pause function information is not transmitted (step S805).

This transmission restraint direction includes a start timing and a cancellation timing of the function temporary pause state (or a period for a function temporary pause state).

Then, the control section 150 of the base station 100 causes the own apparatus (base station 100) to enter a function temporary pause state (step S806).

Then, the control section 150 of the base station 100 decides whether or not it is set to provide a dedicated communication period (legacy-dedicated period) to the slave unit (legacy apparatus) from which the function temporary pause function information is not transmitted (step S807). This legacy-dedicated period is, for example, the period 436, 475 or 496 depicted in FIGS. 6, 8 and 9, respectively. If it is not set to provide a legacy-dedicated period (step S807), then the processing advances to step S816.

If it is set to provide a legacy-dedicated period (step S807), then the control section 150 of the base station 100 decides whether or not it is a cancellation timing of the function temporary pause state of the own apparatus (step S808). If it is not the cancellation timing (step S808), then the control section 150 of the base station 100 waits until the cancellation timing comes.

If it is a cancellation timing of the function temporary pause state of the own apparatus (step S808), then the control section 150 of the base station 100 cancels the function temporary pause state of the own apparatus (base station 100) (step S809). Then, the control section 150 of the base station 100 performs a transmission process for transmitting a transmission restraint cancellation direction (L-TRCD) for a legacy apparatus to the slave unit from which function temporary pause function information is not transmitted (step S810).

Then, the control section 150 of the base station 100 decides whether or not it is a cancellation timing of the function temporary pause state notified by the transmission restraint direction at step S805 (step S811). Then, if it is the cancellation timing (step S811), then the control section 150 of the base station 100 ends operation of the setting process of a function temporary pause state and a transmission restraint state.

If it is not the cancellation timing of the function temporary pause state notified by the transmission restraint direction at step S805 (step S811), then the control section 150 of the base station 100 decides whether or not it is a transmission timing at which a transmission restraint direction (L-TRD) for a legacy apparatus is to be transmitted (step S812). This transmission restraint direction is for second transmission restraint. If it is not the transmission timing (step S812), then the processing returns to step S811.

If it is the transmission timing (step S812), then the control section 150 of the base station 100 performs a transmission process for transmitting a transmission restraint direction (L-TRD) for a legacy apparatus to the slave unit from which the function temporary pause function information is not transmitted (step S813).

Then, the control section 150 of the base station 100 causes the own apparatus (base station 100) to enter a function temporary pause state (step S814).

Then, the control section 150 of the base station 100 decides whether or not it is set to provide a dedicated communication period (legacy-dedicated period) again in the slave unit (legacy apparatus) from which the function temporary pause function information is not transmitted (step S815). The legacy-dedicated period at this time is, for example, the period 498 depicted in FIG. 9. If it is set to provide a legacy-dedicated period again (step S815), then the processing returns to step S809.

If it is not set to provide a legacy-dedicated period again (step S815), then the control section 150 of the base station 100 decides whether or not it is a cancellation timing of the function temporary pause state of the own apparatus (step S816). If it is not the cancellation timing (step S816), then the control section 150 of the base station 100 waits until the cancellation timing comes.

If it is the cancellation timing of the function temporary pause state of the own apparatus (step S816), then the control section 150 of the base station 100 cancels the function temporary pause state of the own apparatus (base station 100) (step S817). It is to be noted that steps S801 to S806 are an example of a control procedure described in the claims.

(Example of Operation of Slave Unit that has Function Temporary Pause Function)

Figure 11:
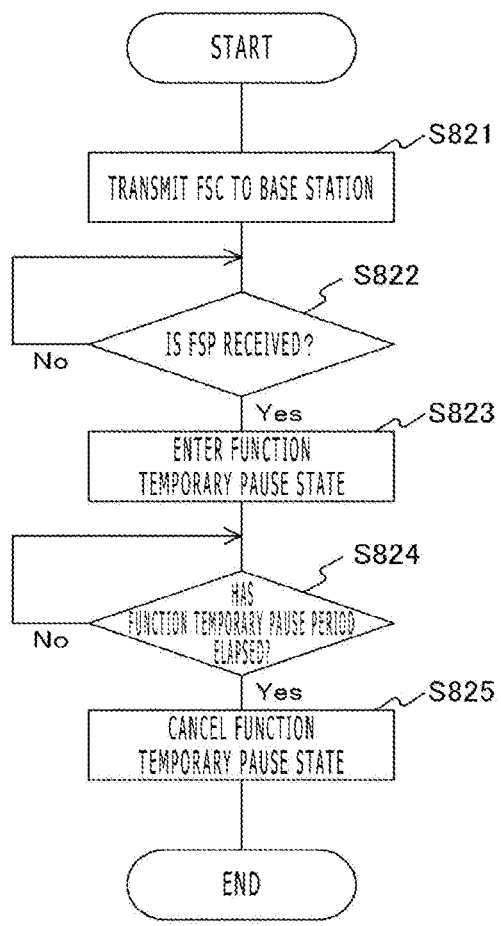
FIG. 11 is a flow chart depicting an example of a processing procedure of a setting process of a function temporary pause state by the slave unit 200 in the first embodiment of the present technology.

FIG. 11 is a flow chart depicting an example of a processing procedure of a setting process of a function temporary pause state by the slave unit 200 in the first embodiment of the present technology.

First, the control section of the slave unit 200 (corresponding to the control section 150 depicted in FIG. 2) performs a transmission process for transmitting function temporary pause function information (FSC) to the base station 100 (step S821). Then, the control section of the slave unit 200 decides whether or not function temporary pause period information (FSP) is received from the base station 100 (step S822). If function temporary pause period information is not received (step S822), then the monitoring is performed continuously.

If function temporary pause period information is received (step S822), then the control section of the slave unit 200 causes the own apparatus (slave unit 200) to enter a function temporary pause state (step S823).

Then, the control section of the slave unit 200 decides on the basis of the received function temporary pause period information whether or not the function temporary pause period has elapsed (step S824). If the function temporary pause period has not elapsed (step S824), then the monitoring is performed continuously until the function temporary pause period elapses.

If the function temporary pause period has elapsed (step S824), then the control section of the slave unit 200 cancels the function temporary pause state of the own apparatus (slave unit 200) (step S825). It is to be noted that steps S822 to S825 are an example of the control procedure described in the claims.

(Example of Operation of Slave Unit (Legacy Apparatus) that does not have Function Temporary Pause Function)

Figure 12:
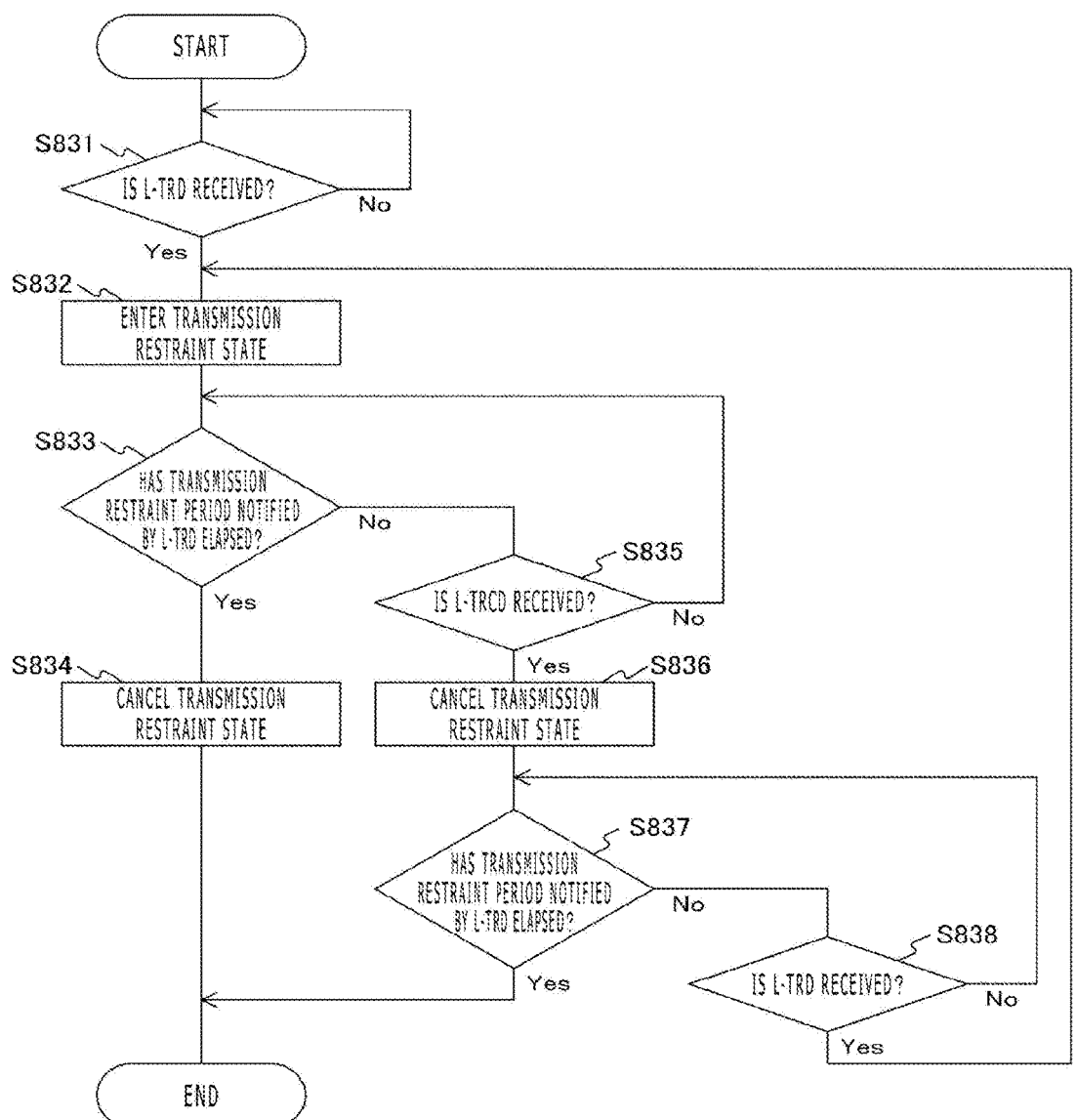
FIG. 12 is a flow chart depicting an example of a processing procedure of a setting process of a transmission restraint state by a slave unit 201 in the first embodiment of the present technology.

FIG. 12 is a flow chart depicting an example of a processing procedure of a setting process of a transmission restraint state by the slave unit 201 in the first embodiment of the present technology.

First, the control section of the slave unit 201 (corresponding to the control section 150 depicted in FIG. 2) decides whether or not a transmission restraint direction (L-TRD) is received from the base station 100 (step S831). If a transmission restraint direction is not received (step S831), then monitoring is performed continuously.

If a transmission restraint direction is received (step S831), then the control section of the slave unit 201 causes the own apparatus (slave unit 201) to enter a transmission restraint state (step S832).

Then, the control section of the slave unit 201 decides whether or not the transmission restraint period has elapsed on the basis of the received transmission restraint direction (step S833). If the transmission restraint period has elapsed (step S833), then the control section of the slave unit 201 cancels the transmission restraint state of the own apparatus (slave unit 201) (step S834).

If the transmission restraint period has not elapsed (step S833), then the control section of the slave unit 201 decides whether or not a transmission restraint cancellation direction (L-TRCD) is received from the base station 100 (step S835). If a transmission restraint cancellation direction is not received (step S835), then the processing returns to step S833.

If a transmission restraint cancellation direction is received (step S835), then the control section of the slave unit 201 cancels the transmission restraint state of the own apparatus (slave unit 201) (step S836).

Then, the control section of the slave unit 201 decides whether or not a transmission restraint period has elapsed on the basis of the transmission restraint direction received at step S831 (step S837). If the transmission restraint period has elapsed (step S837), then the control section of the slave unit 201 ends operation of the setting process of a transmission restraint state.

If the transmission restraint period has not elapsed (step S837), then the control section of the slave unit 201 decides whether or not a transmission restraint direction (L-TRD) is received from the base station 100 (step S838). If a transmission restraint direction is not received (step S838), then the processing returns to step S837. If a transmission restraint direction is received (step S838), then the processing returns to step S832.

(Example of Case in which Slave Unit Cannot Receive Function Temporary Pause Period Information)

In the foregoing, an example of a case in which a slave unit successfully receives function temporary pause period information is indicated. However, it is also supposed that a slave unit may not be able to receive function temporary pause period information by some cause (for example, degradation of the communication environment). Therefore, an example of a case in which a slave unit cannot receive function temporary pause period information is described here.

Figure 13:
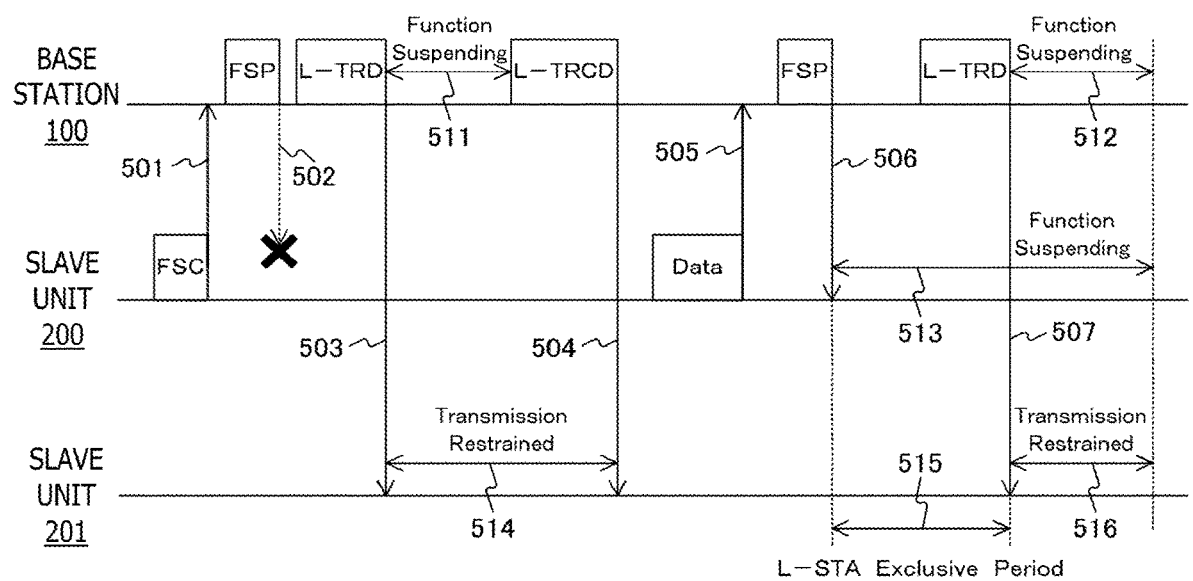
FIG. 13 is a view schematically depicting data exchanged between different apparatus and periods of a function temporary pause state and a transmission restraint state of the individual apparatus in the first embodiment of the present technology.

FIG. 13 is a view schematically depicting data exchanged between different apparatus and periods of a function temporary pause state and a transmission restraint state of the individual apparatus in the first embodiment of the present technology.

The example depicted in FIG. 13 is a modification to the example of FIG. 5. Therefore, part of description of the same portions as those in FIG. 5 is omitted.

First, the slave unit 200 transmits a frame including function temporary pause function information to the base station 100 (501).

Then, the base station 100 transmits a frame including function temporary pause period information to the slave unit 200 (502). In this case, it is assumed that the slave unit 200 cannot receive the frame from some cause (for example, degradation of the communication environment).

Further, after the base station 100 transmits a frame including function temporary pause period information to the slave unit 200 (502), it transmits a frame including a transmission restraint direction to the slave unit 201 (503). It is assumed that, after the transmission of the frame, the base station 100 enters a function temporary pause state (511). However, the slave unit 200 that cannot receive the function temporary pause period information does not enter a function temporary pause state. In this case, the slave unit 200 keeps, for example, ordinary operation.

The slave unit 201 receiving the frame including the transmission restraint direction immediately enters a transmission restraint state (514). Then, the slave unit 201 maintains the transmission restraint state for an entering period included in the frame (514).

Meanwhile, the slave unit 200 that is not notified of the function temporary pause period information although it has transmitted the function temporary pause function information ignores the frame including the transmission restraint direction (503).

Here, FIG. 13 depicts an example in which, within a period within which the base station 100 is in a function temporary pause state and the slave unit 201 is in a transmission restraint state, the base station 100 cancels the function temporary pause state of the own apparatus and sets a legacy-dedicated period.

Further, after the base station 100 cancels the function temporary pause state of the own apparatus, it transmits a frame for cancelling the transmission restraint state of the slave unit 201 to the slave unit 201 (504).

On the other hand, the slave unit 200 that is not notified of the function temporary pause period information although it has transmitted the function temporary pause function information ignores the frame including the transmission restraint cancellation direction (504).

Here, it is also supposed that the slave unit 200 that is not in a function temporary pause state may transmit data to the base station 100 (505). The base station 100 receiving the data from the slave unit 200 that is not in a function temporary pause state in this manner can decide that the slave unit 200 is not in a function temporary pause state. Therefore, the base station 100 transmits the frame including the function temporary pause period information to the slave unit 200 again (506).

For example, also it is supposed that the base station 100 may receive a connection request from a third slave unit that does not belong to the group of the own apparatus within a period (legacy-dedicated period) within which the base station 100 is carrying out a function as a base station only for the slave unit 201. If a connection request from a third slave unit is received within a legacy-dedicated period in this manner, then the base station 100 may notify the third slave unit that it is a legacy-dedicated period (or that connection is rejected).

Further, the present example indicates an example of a case in which one slave unit (slave unit 200) is decided not in a function temporary pause state. However, also it is supposed that it may be decided that a plurality of slave units are not in a function temporary pause state. Where it is decided that a plurality of slave units are not in a function temporary pause state in this manner, a frame including a function temporary pause period may be transmitted individually to each slave unit or may be transmitted collectively and simultaneously to all of the slave units.

Further, the function temporary pause period information transmitted again from the base station 100 to the slave unit 200 includes a period obtained by subtracting a period from the point of time at which the slave unit 200 fails in reception first to the point of time of the second transmission. In other words, the base station 100 sets a new period calculated from the function temporary pause period information the slave unit 200 has failed to receive first (a point of time at which the function temporary pause state is cancelled and a period in which the function temporary pause state is cancelled).

Further, the slave unit 200 receiving the function temporary pause period information enters a function temporary pause state on the basis of the received function temporary pause period information (513). In particular, the slave unit 200 enters a function temporary pause state at an entering point of time included in the received function temporary pause period information and maintains the state for an entering period included in the received function temporary pause period information (513).

In this manner, after the slave unit 201 cancels transmission restraint, the slave unit 200 can be placed into a function temporary pause state (513). Consequently, the base station 100 can carry out a function as a base station only for the slave unit 201 (515).

After transmission restraint of the slave unit 201 is cancelled, the base station 100 transmits a frame including a new transmission restraint direction to the slave unit 201 (507). Consequently, the slave unit 201 enters a transmission restraint state (516).

On the other hand, the slave unit 201 receiving the new transmission restraint direction immediately enters a transmission restraint state and maintains the transmission restraint state for an entering period included in the information (516).

This new transmission restraint direction has a period set therein such that the transmission restraint state is cancelled at a point of time same as a point of time at which the transmission restraint state is cancelled which point of time can be calculated from the transmission restraint direction in the preceding operation cycle.

In this manner, with the first embodiment of the present technology, power saving of the base station and the slave units can be achieved. Further, the base station can perform carrying out of a function for a group or groups other than the group of the own apparatus and a search of the other group or groups, and can increase opportunities of them. Further, the base station can maintain the packet loss rate of a legacy apparatus (slave unit).

Further, with the first embodiment of the present technology, all of them (power saving of the base station, carrying out of a function for the other group or groups than the group of the base station and search of the other group or groups, increase of opportunities of them, and maintenance of the packet loss rate of a legacy apparatus (slave unit)) can be simultaneously achieved.

Further, transmission restraint for a legacy apparatus (slave unit) is carried out, unlike entering into a function temporary pause state, without preparations in advance by the legacy apparatus (slave unit). Therefore, after transmission restraint is directed, by cancelling the transmission restraint temporarily, discarding of packets and so forth by transmission restraint that cannot be supposed by the legacy apparatus (slave unit) can be reduced.

>2. Second Embodiments

In a second embodiment of the present technology, an example is indicated in which, within a period within which the slave unit 200 is in a function temporary pause state, a period within which the base station 100 carries out a function as a base station only for the slave unit 201 is set.

It is to be noted that the configurations of the individual apparatus in the second embodiment of the present technology are substantially the same as those of the base station 100 and the slave units 200 and 201 depicted in FIG. 1, FIG. 2 and so forth. Therefore, elements same as those of the first embodiment of the present technology are denoted by the same reference signs as those of the first embodiment of the present technology and part of description of them is omitted herein.

(Example of Determination of Legacy-dedicated Period)

First, a determination method in a case in which, within a period within which the slave unit 200 is in a function temporary pause state, the base station 100 determines a period (legacy-dedicated period) within which the base station 100 carries out a function as a base station only for the slave unit 201 is described.

The base station 100 can determine a legacy-dedicated period on the basis of information regarding a slave unit (for example, the slave unit 201) that does not have the function temporary pause function. The information regarding a slave unit (slave unit 201) that does not have the function temporary pause function can be, for example, at least one of (E1) to (E3) given below.

(E1) Quantity of slave units that are connected to base station 100 and do not have function temporary pause function (or ratio of such slave units to all slave units)

For example, the base station 100 can determine a legacy-dedicated period on the basis of the quantity of slave units that are connected to the own apparatus (base station 100) and do not have the function temporary pause function (or on the basis of the ratio of such slave units to all slave units). For example, the base station 100 decides whether or not the quantity of slave units that are connected to the own apparatus (base station 100) and do not have the function temporary pause function (or the ratio of such slave units to all slave units) is great with reference to a threshold value (first threshold value) determined in advance. Then, if the quantity of slave units that do not have the function temporary pause function (or the ratio of such slave units to all slave units) is great with reference to the first threshold value (for example, if the quantity of slave units that do not have the function temporary pause function (or the ratio of such slave units to all slave units) is equal to or greater than the first threshold value), then the base station 100 can determine on the basis of the quantity (or the ratio to all slave units) that a plurality of legacy-dedicated periods are to be set. Alternatively, the base station 100 can determine on the basis of the quantity (or the ratio to all slave units) so as to elongate one legacy-dedicated period.

(E2) Permissible delay of Traffic handled by slave unit connected to base station 100

For example, the base station 100 can determine a legacy-dedicated period on the basis of a permissible delay of Traffic handled by a slave unit connected to the own apparatus (base station 100). For example, the base station 100 decides whether or not the permissible delay of Traffic handled by a slave unit connected to the own apparatus (base station 100) is small with reference to a threshold value (second threshold value) determined in advance. Then, if the permissible delay of Traffic handled by a slave unit is small with reference to the second threshold value (for example, if the permissible delay of Traffic handled by a slave unit is equal to or smaller than the second threshold value), then the base station 100 can determine on the basis of the quantity (or ratio) such that a plurality of legacy-dedicated periods are to be set. Alternatively, the base station 100 can determine on the basis of the quantity (or ratio) such that one legacy-dedicated period is to be elongated. Further, where a plurality of slave units are connected to the base station 100, a legacy-dedicated period can be determined on the basis of the quantity (or ratio) of slave units that indicate a permissible delay of Traffic smaller than the second threshold value. For example, if the quantity (or ratio) of slave units that indicate a permissible delay of Traffic smaller than the second threshold value exceeds a threshold value (third threshold value) determined in advance, then the base station 100 can determine on the basis of the quantity (or ratio) such that a plurality of legacy-dedicated periods are to be set. Alternatively, the base station 100 can determine on the basis of the quantity (or ratio) such that one legacy-dedicated period is to be elongated.

(E3) Presence or absence of frame accumulated in slave unit that does not have function temporary pause function For example, the base station 100 can determine a legacy-dedicated period on the basis of whether or not, after a slave unit connected to the own apparatus (base station 100) transmits data, another frame exists which is accumulated in the slave unit. For example, if, after a slave unit connected to the own apparatus (base station 100) transmits data, another frame exists which is accumulated in the slave unit, then the base station 100 can determine on the basis of the accumulated frame or frames (for example, the data amount) that a plurality of legacy-dedicated periods are to be set. Alternatively, the base station 100 can determine on the basis of the frame or frames (for example, the data amount) that one legacy-dedicated period is to be elongated.

Further, where a plurality of slave units are connected to the base station 100, a legacy-dedicated period can be determined on the basis of the quantity (or ratio) of slave units in which an accumulated frame exists. For example, the base station 100 can determine that a plurality of legacy-dedicated periods are to be set until the quantity (or ratio) of slave units in which an accumulated frame exists becomes smaller than a fourth threshold value. Alternatively, the base station 100 can determine on the basis of the quantity (or ratio) of such slave units such that one legacy-dedicated period is to be elongated.

Further, the base station 100 can determine a legacy-dedicated period on the basis of information regarding the own apparatus (base station 100). The information regarding the own apparatus (base station 100) can be, for example, information regarding the power supply of the own apparatus (base station 100) (for example, the remaining battery capacity).

For example, the base station 100 can determine a legacy-dedicated period on the basis of the remaining battery capacity of the own apparatus (base station 100). For example, if the remaining battery capacity of the own apparatus (base station 100) is small with reference to a threshold value (fifth threshold value), then the base station 100 can determine that a legacy-dedicated period is not to be set.

An example of communication in a case in which a legacy-dedicated period is set on the basis of (E3) described above is described.

(Example of Communication when Legacy-dedicated Period is Determined)

Figure 14:
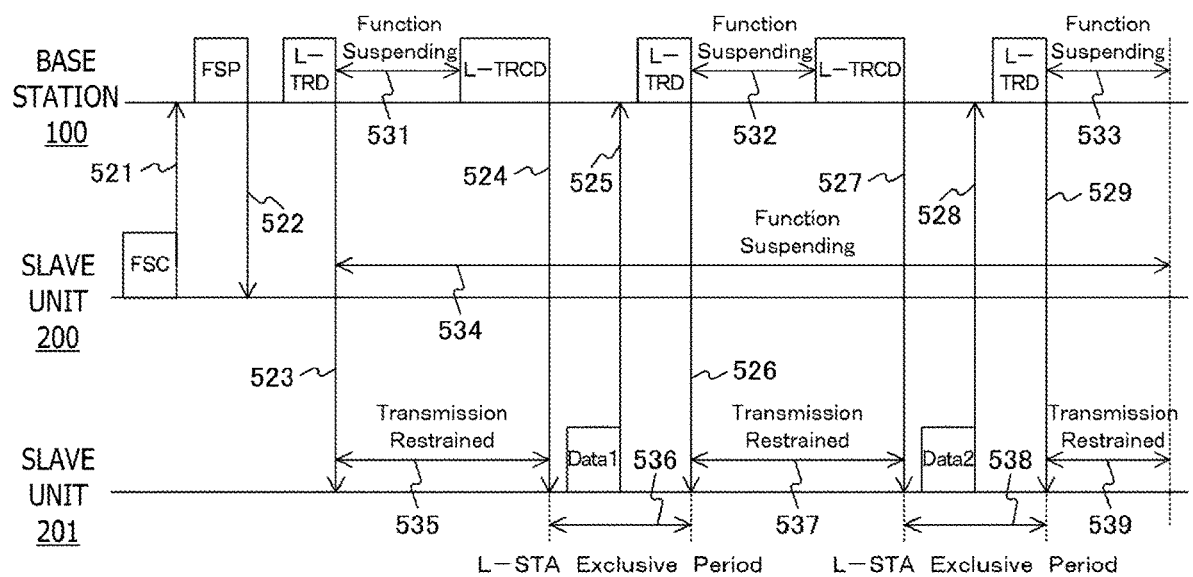
FIG. 14 is a view schematically depicting data exchanged between different apparatus and periods of a function temporary pause state and a transmission restraint state of the individual apparatus in a second embodiment of the present technology.

FIG. 14 is a view schematically depicting data exchanged between different apparatus and periods of a function temporary pause state and a transmission restraint state of the individual apparatus in the second embodiment of the present technology.

The example depicted in FIG. 14 is a modification to that of FIG. 9. Therefore, part of description of portions same as those of FIG. 9 is omitted.

In particular, transmission of frames (521 to 524, 526, 527 and 529) depicted in FIG. 14 corresponds to transmission of the frames (481 to 487) depicted in FIG. 9. However, the function temporary pause period information included in the frame transmitted from the base station 100 to the slave unit 200 is different from that of FIG. 9.

Further, periods (531 to 539) depicted in FIG. 14 correspond to transmission of the frames (491 to 499) depicted in FIG. 9. However, the length of each of the periods set to the base station 100 and the slave unit 201 is different from that of FIG. 9.

The slave unit 201 transmits data (Data1) within a legacy-dedicated period (536) within which the base station 100 carries out a function as a base station only for the slave unit 201 (525). The data (Data1) transmitted in this case includes information indicating that another data exists in the slave unit 201.

The information indicating that another data exists in the slave unit 201 can be stored, for example, into More data Subfield in Frame Control field defined by IEEE Std 802.11 (TM)-2012. Alternatively, the information may be stored into a different field or into a different frame.

The base station 100 receiving the data (Data1) can recognize that anther data exists in the slave unit 201.

In this case, the base station 100 decides whether or not the period of time till an end point of time of the function temporary pause period of the slave unit 200 determined in the preceding operation cycle is short with reference to a threshold value (sixth threshold value) determined in advance.

If the period of time till the end point of time of the function temporary pause period of the slave unit 200 determined in the preceding operation cycle is short with reference to the sixth threshold value (for example, if the period of time is equal to or shorter than the sixth threshold value), then the base station 100 determines that a legacy-dedicated period within which a function as a base station only for the slave unit 201 is to be carried out is to be set again. By this determination, the base station 100 sets a legacy-dedicated period (538) within which it carries out a function as a base station only for the slave unit 201.

Within the legacy-dedicated period (538), the slave unit 201 transmits data (Data2) (528). A case is supposed in which information indicating that another data exists in the slave unit 201 is not included in the data (Data2) transmitted in this instance. In this case, the base station 100 determines that it does not set again a legacy-dedicated period within which the base station 100 is to carry out a function as a base station only for the slave unit 201.

Meanwhile, another case is supposed in which information indicating that another data exists in the slave unit 201 is included in the data (Data2) transmitted from the slave unit 201. In this case, the base station 100 sets again a legacy-dedicated period within which it carries out a function as a base station only for the slave unit 201 until after information indicating that another data exists is no more included in the data (Data2).

(Example of Operation of Base Station)

Figure 15:
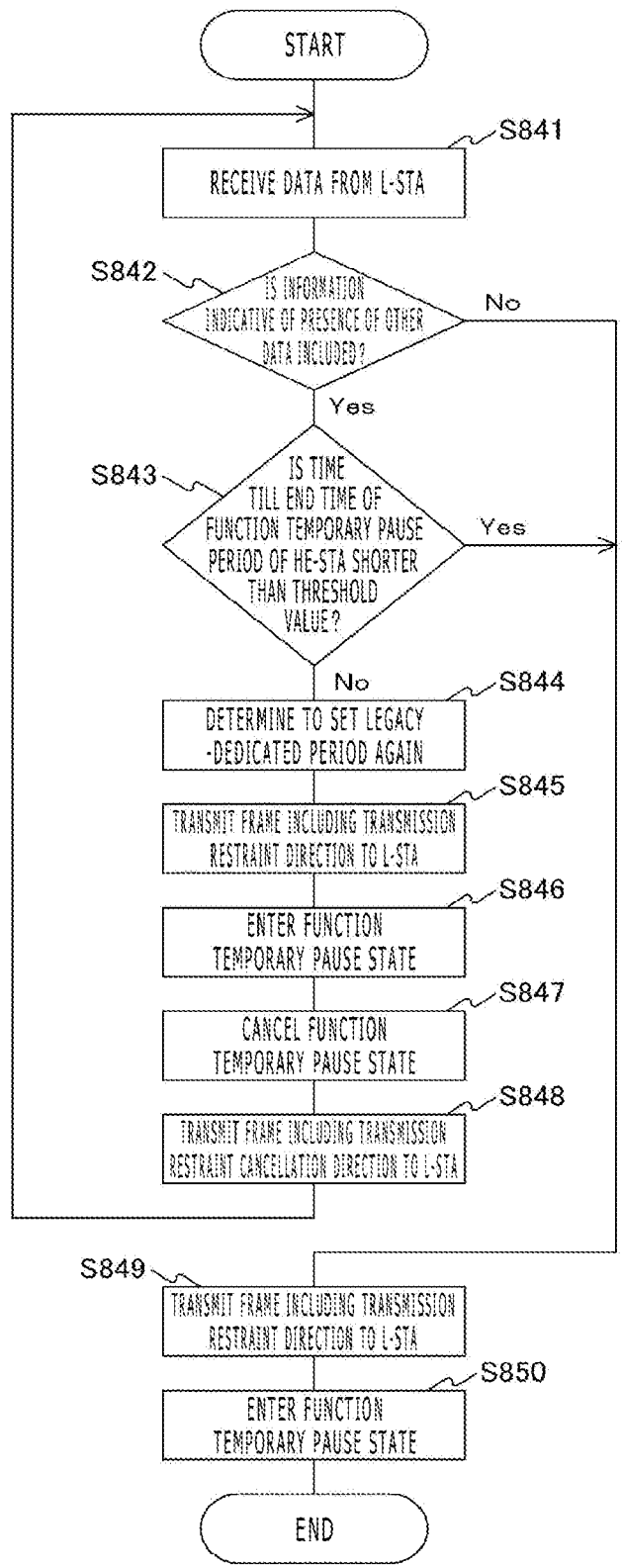
FIG. 15 is a flow chart depicting an example of a processing procedure of a setting process of a function temporary pause state and a transmission restraint state by a base station 100 in the second embodiment of the present technology.

FIG. 15 is a flow chart depicting an example of a processing procedure of a setting process of a function temporary pause state and a transmission restraint state by the base station 100 in the second embodiment of the present technology.

FIG. 15 depicts an example of a case in which a first legacy-dedicated period (for example, a period 536 depicted in FIG. 14) within which the base station 100 carries out a function as a base station only for a slave unit that does not have the function temporary pause function is started. In other words, an example of a case is depicted in which a slave unit having the function temporary pause function is in a function temporary pause state and another slave unit that does not have the function temporary pause function is in a state in which the transmission restraint state is cancelled.

First, the control section 150 of the base station 100 receives data from a slave unit (L-STA) that does not have the function temporary pause function (step S841). Then, the control section 150 of the base station 100 decides whether or not the received data includes information indicating that another data is included in the slave unit from which the data is transmitted (data presence notification information) (step S842).

If the information (data presence notification information) is not included (step S842), then the control section 150 of the base station 100 performs a transmission process for transmitting a frame including a transmission restraint direction to the slave unit (step S849). Then, the control section 150 of the base station 100 causes the own apparatus (base station 100) to enter a function temporary pause state (step S850).

If the information (data presence notification information) is included (step S842), then the control section 150 of the base station 100 decides whether or not the period of time till a point of time of an end of the function temporary pause period of the slave unit (HE-STA) determined in the preceding operation cycle is short with reference to the sixth threshold value (step S843). If the period of time till a point of time of an end of the function temporary pause period of the slave unit determined in the preceding operation cycle is short with reference to the sixth threshold value (step S843), then the processing advances to step S849.

If the period of time till a point of time of an end of the function temporary pause period of the slave unit determined in the preceding operation cycle is long with reference to the sixth threshold value (step S843), then the control section 150 of the base station 100 determines to set a legacy-dedicated period again (step S844). By this determination, the base station 100 sets a legacy-dedicated period again.

Then, the control section 150 of the base station 100 performs a transmission process for transmitting a frame including a transmission restraint direction to the legacy apparatus (slave unit) (step S845). Then, the control section 150 of the base station 100 causes the own apparatus (base station 100) to enter a function temporary pause state (step S846).

Then, the control section 150 of the base station 100 cancels the function temporary pause state of the own apparatus (base station 100) at a timing at which the function temporary pause state is cancelled (step S847). Then, the control section 150 of the base station 100 performs a transmission process for transmitting a frame including a transmission restraint cancellation direction to the legacy apparatus (slave unit) (step S848).

It is to be noted that FIG. 15 indicates an example in which whether a legacy-dedicated period is to be set again is determined on the basis of whether or not another data exists in the slave unit (legacy apparatus) and whether or not the period of time till the point of time of an end of the function temporary pause period of the slave unit other than the legacy apparatus is long with reference to the sixth threshold value. However, whether or not a legacy-dedicated period is to be set again may be determined using a different criterion as described hereinabove.

For example, where a plurality of slave units (legacy apparatus) are connected, whether or not a legacy-dedicated period is to be set again can be determined on the basis of whether or not the quantity (or ratio) of slave units (legacy apparatus) in which an accumulated frame exists is greater than a threshold value determined in advance. In this case, for example, if the quantity (or ratio) of slave units (legacy apparatus) in which an accumulated frame exists is greater than the threshold value determined in advance, then the processes described above are repeated until the quantity (or ratio) becomes smaller than the threshold value. Then, for a period until the quantity (or ratio) becomes smaller than the threshold value, a legacy-dedicated period is set again.

In this manner, the control section 150 can determine a period within which a function as a base station is to be temporarily carried out on the basis of information regarding a slave unit (slave unit that does not have the specific function) or information regarding the power supply of the base station 100. In this case, the control section 150 can use, as the information regarding a slave unit (slave unit that does not have the specific function), the quantity or the ratio of slave units connected to the base station 100 (slave units that do not have the specific function). Further, the control section 150 can use, as the information regarding a slave unit (slave unit that does not have the specific function), a permissible delay of traffic handled by a slave unit connected to the base station 100 (slave unit that does not have the specific function). Further, the control section 150 can use presence or absence of data accumulated in a slave unit (slave unit that does not have the specific function). Further, the control section 150 may use a combination of plural ones of the kinds of information described above.

In this manner, with the second embodiment of the present technology, a legacy-dedicated period can be set on the basis of information regarding a slave unit (legacy apparatus) connected to the base station or information regarding the base station. The packet loss rate of the slave unit (legacy apparatus) can be maintained thereby.

Here, in order to reduce the power consumption of a base station in a wireless LAN, a period in which the base station enters a Doze state in which the power consumption is low is prescribed. However, if a function non-compatible apparatus is included in the slave units connected to the base station, then the base station cannot set an appropriate Doze period. In this case, the function non-compatible apparatus cannot recognize a Doze period of the base station and there is the possibility that the function non-compatible apparatus may continue to resend data.

Therefore, in the embodiments of the present technology, an Awake period (legacy-dedicated period) for a function non-compatible apparatus is provided by at least one or more times within a Doze period of the base station to which the function non-compatible apparatus is connected. However, within any legacy-dedicated period, a function compatible apparatus remains in a Doze period. In this manner, the power consumption of the base station can be reduced, and communication with a legacy apparatus can be performed appropriately using a legacy-dedicated period.

In particular, in the embodiments of the present technology, when the base station enters a function temporary pause state and can no more perform reception from and response to a slave unit, the base station notifies each slave unit of this. In this case, the base station directs transmission restraint to a slave unit (legacy apparatus) that cannot understand the notification. Where a notification in advance is not received and the slave unit (legacy apparatus) is restrained from transmission in this manner, it is significant to prevent data of the slave unit (legacy apparatus) restrained from transmission from being discarded. Therefore, after a function temporary pause period notified in advance is started, the base station cancels the function temporary pause state and cancels transmission restraint of the slave unit (legacy apparatus) and sets a legacy-dedicated period.

Further, the base station 100 and the slave units 200 and 201 in the embodiments of the present technology can be applied to apparatus used in various fields. For example, they can be applied to wireless apparatus used in an automobile (for example, a car navigation apparatus or a smartphone). Further, for example, they can be applied to learning apparatus used in the education field (for example, a tablet terminal). Further, they can be applied, for example, to wireless apparatus used in the agriculture field (for example, a terminal of a cattle management system). Similarly, for example, they can be applied to various wireless apparatus that are used in the sport field, medial field and so forth.

>3. Application Examples≤

The technology according to the present disclosure can be applied to various products. For example, the base station 100 and the slave units 200 and 201 can each be implemented as a mobile terminal such as a smartphone, a tablet personal computer (PC), a notebook PC, a portable game terminal or a digital camera, as a fixed terminal such as a television receiver, a printer, a digital scanner or a network storage or as an in-vehicle terminal such as a car navigation apparatus. Further, the base station 100 and the slave units 200 and 201 may each be implemented as a terminal that performs machine-to-machine (M2M) communication (the terminal is also called machine type communication (MTC) terminal) such as a smart meter, a vending machine, a remote monitoring apparatus or a point of sale (POS) terminal. Furthermore, the base station 100 and the slave units 200 and 201 may each be a wireless communication module (for example, an integrated circuit module configured by one die) incorporated in the terminals described above.

Meanwhile, for example, the base station 100 may be implemented as a wireless LAN access point (also called wireless base station) that has a router function or does not have a router function. Further, the base station 100 may be implemented as a mobile wireless LAN router. Furthermore, the base station 100 may be a wireless communication module (for example, an integrated circuit module configured by one die) incorporated in the apparatus described above.

(3-1. First Application Example)

Figure 16:
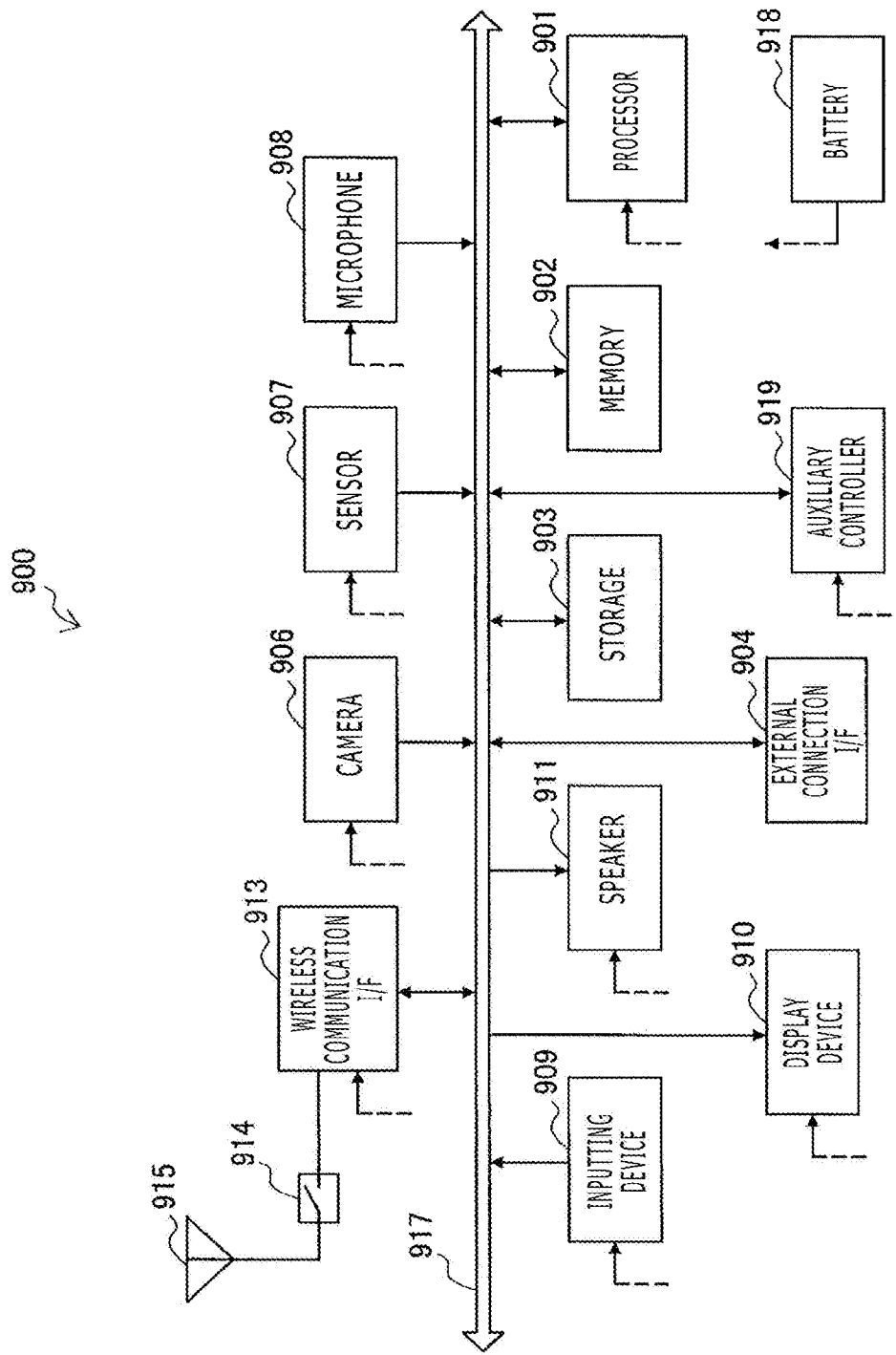
FIG. 16 is a block diagram depicting an example of a schematic configuration of a smartphone.

FIG. 16 is a block diagram depicting an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an inputting device 909, a display device 910, a speaker 911, a wireless communication interface 913, an antenna switch 914, an antenna 915, a bus 917, a battery 918 and an auxiliary controller 919.

The processor 901 may be, for example, a central processing unit (CPU) or a system on chip (SoC) and controls functions of an application layer and other layers of the smartphone 900. The memory 902 includes a random access memory (RAM) and a ROM and stores programs to be executed by the processor 901 and data. The storage 903 can include a storage medium such as a semiconductor memory or a hard disk. The external connection interface 904 is an interface for connecting an external device such as a memory card or a universal serial bus (USB) device to the smartphone 900.

The camera 906 has an image pickup element such as a charge coupled device (CCD) image pickup element or a complementary metal oxide semiconductor (CMOS) image pickup element and generates a picked up image. The sensor 907 can include a sensor group, for example, including a position sensor, a gyro sensor, a geomagnetism sensor and an acceleration sensor. The microphone 908 converts sound inputted to the smartphone 900 into a sound signal. The inputting device 909 includes, for example, a touch sensor for detecting a touch with a screen of the display device 910, a keypad, a keyboard, a button or a switch and accepts an operation or an information input from a user. The display device 910 has a screen of a liquid crystal display (LCD), an organic light emitting diode (OLED) display or the like and displays an output image of the smartphone 900. The speaker 911 converts a sound signal outputted from the smartphone 900 into sound.

The wireless communication interface 913 supports one or more of wireless LAN standards such as IEEE802.11a, 11b, 11g, 11n, 11ac and 11ad and executes wireless communication. The wireless communication interface 913 can communicate, in an infrastructure mode, with a different apparatus through a wireless LAN access point. Further, the wireless communication interface 913 can communicate, in a direct communication mode such as an ad hoc mode or Wi-Fi Direct, directly with a different apparatus. It is to be noted that, although, different from an ad hoc mode, in Wi-Fi Direct, one of two terminals operates as an access point, communication is performed directly between the terminals. The wireless communication interface 913 can typically include a baseband processor, a radio frequency (RF) circuit, a power amplifier and so forth. The wireless communication interface 913 may be a one-chip module in which a memory for storing a communication controlling program, a processor for executing the program and related circuits are integrated. The wireless communication interface 913 may support, in addition to a wireless LAN method, some other wireless communication method such as a short-range wireless communication method, a close proximity wireless communication method or a cellular communication method. The antenna switch 914 switches the connection destination of the antenna 915 between or among a plurality of circuits (for example, circuits for different wireless communication methods) included in the wireless communication interface 913. The antenna 915 has a single or a plurality of antenna elements (for example, a plurality of antenna elements configuring a multiple-input and multiple-output (MIMO) antenna) and is used for transmission and reception of a wireless signal by the wireless communication interface 913.

It is to be noted that the smartphone 900 is not limited to the example of FIG. 16 but may include a plurality of antennae (for example, an antenna for a wireless LAN, an antenna for a close proximity wireless communication method, and so forth). In this case, the antenna switch 914 may be omitted from the configuration of the smartphone 900.

The bus 917 connects the processor 901, memory 902, storage 903, external connection interface 904, camera 906, sensor 907, microphone 908, inputting device 909, display device 910, speaker 911, wireless communication interface 913 and auxiliary controller 919 to each other. The battery 918 supplies electric power to the blocks of the smartphone 900 depicted in FIG. 16 through a feed line partially indicated by a broken line in FIG. 16. The auxiliary controller 919 causes, for example, in a sleep mode, minimum required functions of the smartphone 900 to operate.

In the smartphone 900 depicted in FIG. 16, the control section 150 described hereinabove with reference to FIG. 2 may be incorporated in the wireless communication interface 913. Further, at least some of the functions may be incorporated in the processor 901 or the auxiliary controller 919. For example, if the control section 150 sets a function temporary pause state, then it can reduce the power consumption of the battery 918.

It is to be noted that the smartphone 900 may operate as a wireless access point (software AP) by causing the processor 901 to execute an access point function on the application level. Alternatively, the wireless communication interface 913 may have a wireless access point function.

(3-2. Second Application Example)

Figure 17:
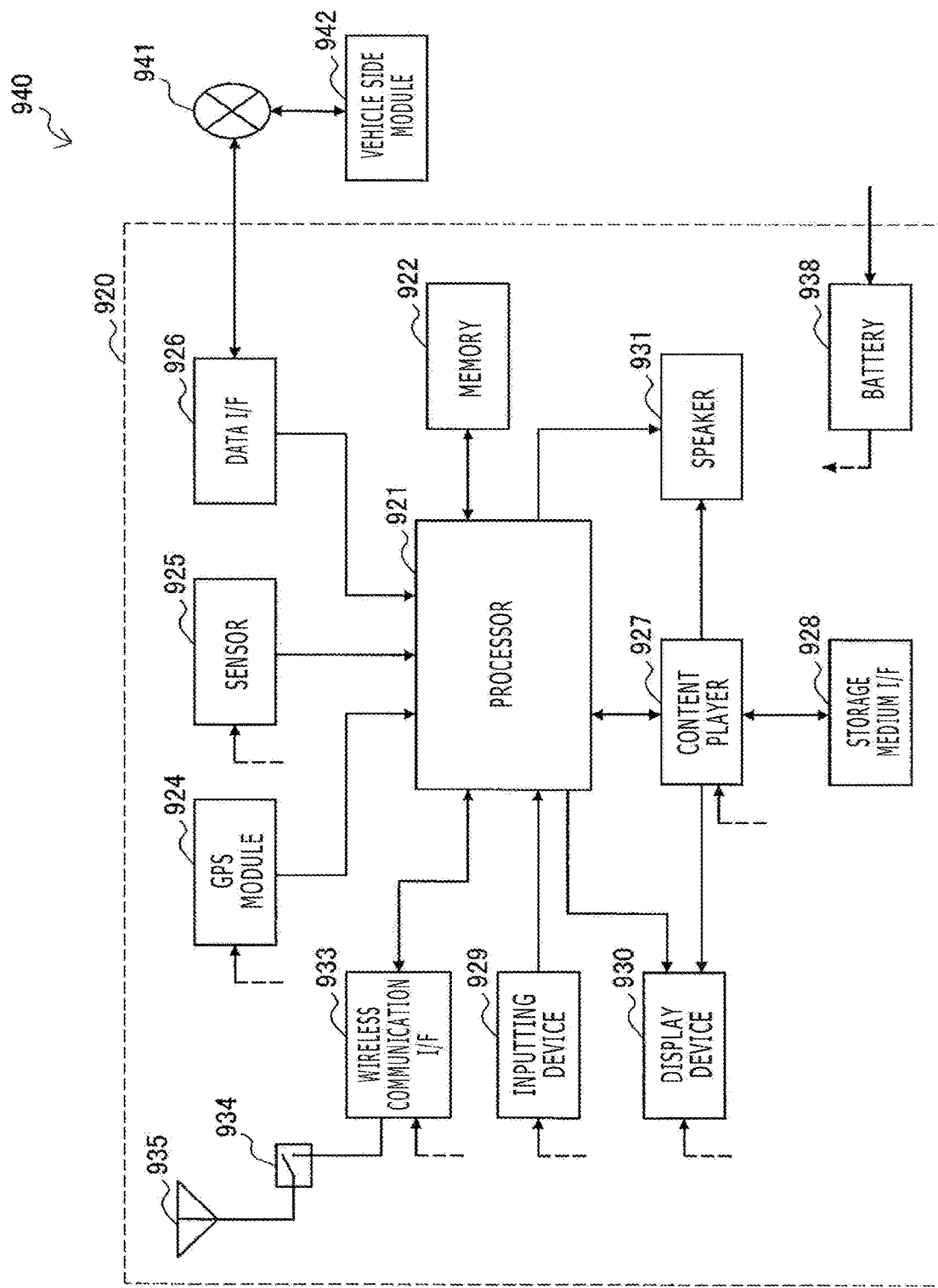
FIG. 17 is a block diagram depicting an example of a schematic configuration of a car navigation apparatus.

FIG. 17 is a block diagram depicting an example of a schematic configuration of a car navigation apparatus 920 to which the technology of the present disclosure can be applied. The car navigation apparatus 920 includes a processor 921, a memory 922, a global positioning system (GPS) module 924, a sensor 925, a data interface 926, a content player 927, a storage medium interface 928, an inputting device 929, a display device 930, a speaker 931, a wireless communication interface 933, an antenna switch 934, an antenna 935 and a battery 938.

The processor 921 may be, for example, a CPU or an SoC and controls a navigation function and other functions of the car navigation apparatus 920. The memory 922 includes a RAM and a ROM and stores programs to be executed by the processor 921 and data.

The GPS module 924 measures the position of the car navigation apparatus 920 (for example, latitude, longitude and altitude) using GPS signals received from GPS satellites. The sensor 925 can include a sensor group, for example, including a gyro sensor, a geomagnetism sensor and an atmospheric pressure sensor. The data interface 926 is connected, for example, to an in-vehicle network 941 through a terminal not depicted and acquires data generated by the vehicle side such as vehicle speed data.

The content player 927 reproduces a content stored in a storage medium (for example, a CD or a DVD) inserted in the storage medium interface 928. The inputting device 929 includes, for example, a touch sensor that detects a touch with a screen of the display device 930, a button, a switch and so forth and accepts an operation or an information input from a user. The display device 930 has a screen of an LCD or OLED display or the like and displays an image of a navigation function or an image of a reproduced content. The speaker 931 outputs sound of the navigation function or of a reproduced content.

The wireless communication interface 933 supports one or more of wireless LAN standards such as IEEE802.11a, 11b, 11g, 11n, 11ac and 11ad and executes wireless communication. The wireless communication interface 933 can communicate, in an infrastructure mode, with a different apparatus through a wireless LAN access point. Further, the wireless communication interface 933 can communicate, in a direct communication mode such as an ad hoc mode or Wi-Fi Direct, directly with a different apparatus. The wireless communication interface 933 can typically include a baseband processor, an RF circuit, a power amplifier and so forth. The wireless communication interface 933 may be a one-chip module in which a memory for storing a communication controlling program, a processor for executing the program and related circuits are integrated. The wireless communication interface 933 may support, in addition to a wireless LAN method, some other wireless communication method such as a short-range wireless communication method, a close proximity wireless communication method or a cellular communication method. The antenna switch 934 switches the connection destination of the antenna 935 between or among a plurality of circuits included in the wireless communication interface 933. The antenna 935 has a single or a plurality of antenna elements and is used for transmission and reception of a wireless signal by the wireless communication interface 933.

It is to be noted that the car navigation apparatus 920 is not limited to the example of FIG. 17 but may include a plurality of antennae. In this case, the antenna switch 934 may be omitted from the configuration of the car navigation apparatus 920.

The battery 938 supplies electric power to the blocks of the car navigation apparatus 920 depicted in FIG. 17 through a feed line partially depicted by a broken line in FIG. 17. Further, the battery 938 accumulates electric power fed from the vehicle side.

In the car navigation apparatus 920 depicted in FIG. 17, the control section 150 described hereinabove with reference to FIG. 2 may be incorporated in the wireless communication interface 933. Further, at least some of the functions may be incorporated in the processor 921.

Further, the wireless communication interface 933 may operate as the base station 100 described hereinabove and provide wireless connection to a terminal which a user who rides on a vehicle has.

Further, the technology according to the present disclosure may be implemented as an in-vehicle system (or vehicle) 940 including one or more of the blocks of the car navigation apparatus 920 described above, the in-vehicle network 941 and a vehicle side module 942. The vehicle side module 942 generates vehicle side data such as a vehicle speed, an engine speed or failure information and outputs the generated data to the in-vehicle network 941.

(3-3. Third Application Example)

Figure 18:
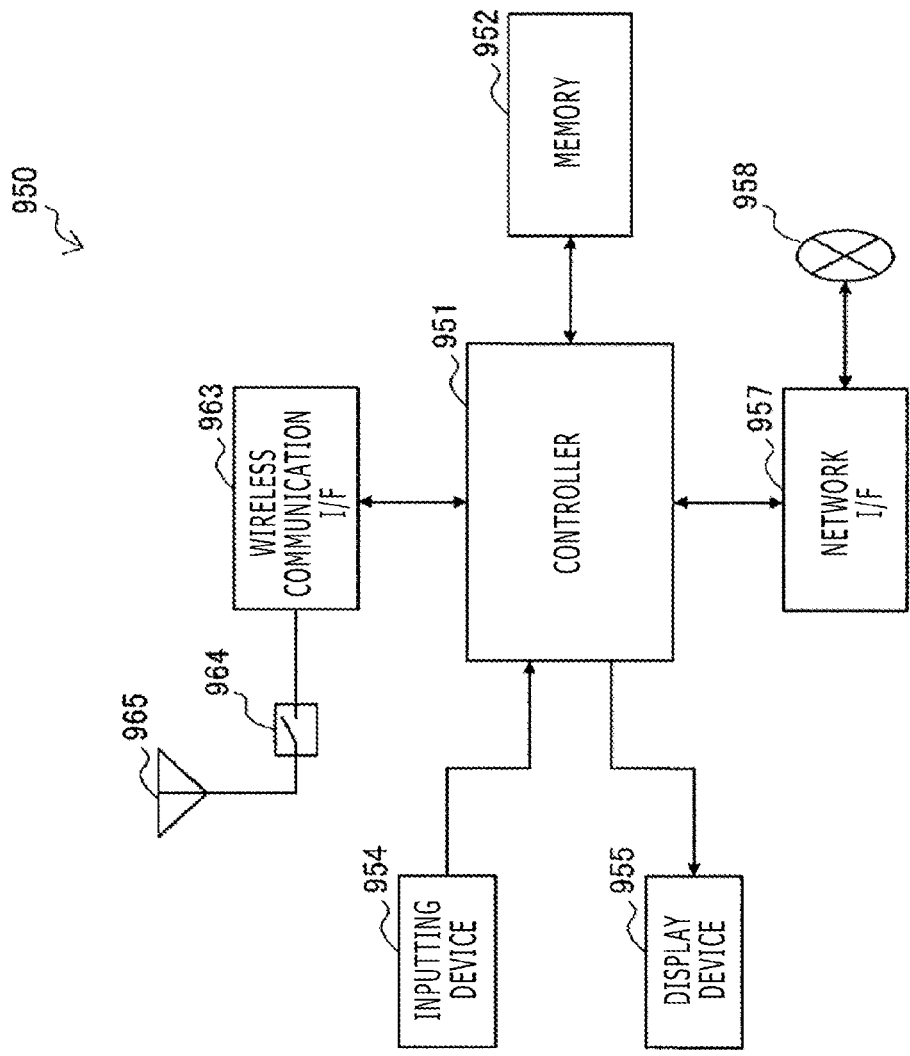
FIG. 18 is a block diagram depicting an example of a schematic configuration of a wireless access point.

FIG. 18 is a block diagram depicting an example of a schematic configuration of a wireless access point 950 to which the technology according to the present disclosure can be applied. The wireless access point 950 includes a controller 951, a memory 952, an inputting device 954, a display device 955, a network interface 957, a wireless communication interface 963, an antenna switch 964 and an antenna 965.

The controller 951 may be, for example, a CPU or a digital signal processor (DSP) and causes various functions (for example, for access restriction, routing, encryption, firewall, log management and so forth) of the Internet protocol (IP) layer and upper layers of the wireless access point 950 to operate. The memory 952 includes a RAM and a ROM and stores programs to be executed by the controller 951 and various kinds of control data (for example, a terminal list, a routing table, an encryption key, security setting, a log and so forth).

The inputting device 954 includes, for example, a button, a switch and so forth and accepts an operation from a user. The display device 955 includes an LED lamp or the like and displays an operation status of the wireless access point 950.

The network interface 957 is a wired communication interface for allowing the wireless access point 950 to be connected to a wired communication network 958. The network interface 957 may have a plurality of connection terminals. The wired communication network 958 may be a LAN such as the Ethernet (registered trademark) or may be a wide area network (WAN).

The wireless communication interface 963 supports one or more of wireless LAN standards such as IEEE802.11a, 11b, 11g, 11n, 11ac and 11ad and serves as an access point to neighboring terminals to provide wireless connection. The wireless communication interface 963 can typically include a baseband processor, an RF circuit, a power amplifier and so forth. The wireless communication interface 963 may be a one-chip module in which a memory for storing a communication controlling program, a processor for executing the program and related circuits are integrated. The antenna switch 964 switches the connection destination of the antenna 965 between or among a plurality of circuits included in the wireless communication interface 963. The antenna 965 has a single or a plurality of antenna elements and is used for transmission and reception of a wireless signal by the wireless communication interface 963.

In the wireless access point 950 depicted in FIG. 18, the control section 150 described hereinabove with reference to FIG. 2 may be incorporated in the wireless communication interface 963. Further, at least some of the functions may be incorporated in the controller 951.

It is to be noted that the embodiments described above indicate an example for embodying the present technology, and matters in the embodiments and matters to define the invention in the claims individually have a corresponding relation. Similarly, matters to define the invention in the claims and matters in the embodiments of the present technology having the same designations applied thereto individually have a corresponding relation. However, the present technology is not limited to the embodiments and can be embodied by modifying the embodiments in various manners without departing from the subject matter of the present technology.

Further, any of the processing procedures described hereinabove in connection with the above-described embodiments may be grasped as a method having the series of steps and may be grasped as a program for causing a computer to execute the series of steps or as a recording medium in which the program is stored. As the recording medium, for example, a CD, a mini disc (MD), a DVD, a memory card, a Blu-ray (registered trademark) disc and so forth can be used.

It is to be noted that the advantageous effects described herein are exemplary to the last and are not restrictive, and other advantages may be available.

It is to be noted that the present technology can also take the following configurations.

(1)

An information processing apparatus, including:

a control section that performs control for notifying, when at least some of functions of the own apparatus is to be temporarily paused, a first apparatus that has a specific function of a function temporary pause period within which at least some of functions of the first apparatus is to be temporarily paused and directing a second apparatus that does not have the specific function to restrain transmission.

(2)

The information processing apparatus according to (1) above, in which the specific function is a function capable of understanding a frame for the notification of the function temporary pause period.

(3)

The information processing apparatus according to (1) or (2) above, in which the information processing apparatus is an information processing apparatus that has a function as a base station, and the control section notifies, when the function as the base station is to be temporarily paused, the first apparatus of the function temporary pause period and directs the transmission restraint to the second apparatus.

(4)

The information processing apparatus according to (3) above, in which the control section performs, when the function as the base station is to be temporarily carried out within a period within which the function as the base station is to be temporarily paused, direction for cancelling the transmission restraint to the second apparatus and directs the transmission restraint to the second apparatus again after the temporary carrying out is performed with the second apparatus.

(5)

The information processing apparatus according to (4) above, in which the control section sets at least one or more periods, within which the function as the base station is to be temporarily carried out, within the function temporary pause period of the first apparatus.

(6)

The information processing apparatus according to (4) or (5) above, in which the control section determines a period, within which the function as the base station is to be temporarily carried out, based on information regarding the second apparatus or information regarding a power supply of the information processing apparatus.

(7)

The information processing apparatus according to (6) above, in which the control section uses, as the information regarding the second apparatus, at least one of a quantity or a ratio of the second apparatus connected to the information processing apparatus, a permissible delay of traffic handled by the second apparatus connected to the information processing apparatus and presence or absence of data accumulated in the second apparatus.

(8)

The information processing apparatus according to any one of (1) to (7) above, in which the control section directs the transmission restraint to the second apparatus after a point of time of start of the function temporary pause period notified to the first apparatus.

(9)

The information processing apparatus according to any one of (1) to (8) above, in which the control section sets a period longer than a temporary pause period of the information processing apparatus as the function temporary pause period for the first apparatus.

(10)

The information processing apparatus according to any one of (1) to (9) above, in which the control section transmits a frame, which includes the function temporary pause period and a start timing of the function temporary pause period, as a frame for the notification of the function temporary pause period to the first apparatus.

(11)

The information processing apparatus according to any one of (1) to (10) above, in which the control section notifies, when a notification that the first apparatus has the specific function is received from the first apparatus, the first apparatus of the function temporary pause period.

(12)

The information processing apparatus according to any one of (1) to (11) above, in which the temporary pause of the information processing apparatus is at least one of a temporary pause for allowing the information processing apparatus to enter a power saving state, a temporary pause of functions other than a function for temporarily pausing a function of a group to which the information processing apparatus belongs while allowing a function of a group different from the group to be carried out, and a temporary pause of functions other than a function for temporarily pausing a function of the group to which the information processing apparatus belongs while searching for a new group to which the information processing apparatus is to belong.

(13)

An information processing apparatus, including:

a control section that performs, when at least some of functions of a different apparatus is to be temporarily paused, control for setting, based on a function temporary pause period notified from the different apparatus, a period within which at least some of functions of the own apparatus is to be temporarily paused.

(14)

The information processing apparatus according to (13) above, in which the control section performs control for notifying the different apparatus that the information processing apparatus has a specific function for understanding a frame for the notification of the function temporary pause period.

(15)

The information processing apparatus according to (13) or (14) above, in which the function temporary pause period notified from the different apparatus is a period longer than a function temporary pause period set to the different apparatus.

(16)

A communication system, including:

a first information processing apparatus that notifies, when at least some of functions of the first information processing apparatus is to be temporarily paused, a second information processing apparatus, which has a specific function, of a function temporary pause period within which at least some of functions of the second information processing apparatus is to be temporarily paused, and directs transmission restraint to a third information processing apparatus, which does not have the specific function;

the second information processing apparatus that temporarily pauses, when the notification of the function temporary pause period is received from the first information processing apparatus, at least some of the functions of the second information processing apparatus;

and the third information processing apparatus that sets the transmission restraint when the direction for the transmission restraint is received from the first information processing apparatus.

(17)

An information processing method, including:

a control procedure for notifying, when at least some of functions of an own apparatus is to be temporarily paused, a first apparatus, which has a specific function, of a function temporary pause period within which at least some of functions of the first apparatus is to be temporarily paused and directing transmission restraint to a second apparatus that does not have the specific function.

(18)

An information processing method, including:

a control procedure for setting, when at least some of functions of a different apparatus is to be temporarily paused, based on a function temporary pause period notified from the different apparatus, a period within which at least some of functions of an own apparatus is to be temporarily paused.

(19)

A program for causing a computer to execute a control procedure for notifying, when at least some of functions of an own apparatus is to be temporarily paused, a first apparatus, which has a specific function, of a function temporary pause period within which at least some of functions of the first apparatus is to be temporarily paused and directing transmission restraint to a second apparatus that does not have the specific function.

(20)

A program for causing a computer to execute a control procedure for setting, when at least some of functions of a different apparatus is to be temporarily paused, based on a function temporary pause period notified from the different apparatus, a period within which at least some of functions of an own apparatus is to be temporarily paused.

REFERENCE SIGNS LIST

10 Communication system
100 Base station (information processing apparatus)
110 Data processing section
120 Communication section
121 Modulation-demodulation section
122 Signal processing section
123, 124 Wireless interface section
125, 126 Amplification section
127, 128 Antenna
129 Channel estimation section
130 Storage section
140 Power supply section
150 Control section
200, 201 Slave unit (information processing apparatus)
900 Smartphone
901 Processor
902 Memory
903 Storage
904 External connection interface
906 Camera
907 Sensor
908 Microphone
909 Inputting device
910 Display device
911 Speaker
913 Wireless communication interface
914 Antenna switch
915 Antenna
917 Bus
918 Battery
919 Auxiliary controller
920 Car navigation apparatus
921 Processor
922 Memory
924 GPS module
925 Sensor
926 Data interface
927 Content player
928 Storage medium interface
929 Inputting device
930 Display device
931 Speaker
933 Wireless communication interface
934 Antenna switch
935 Antenna
938 Battery
941 In-vehicle network
942 Vehicle side module
950 Wireless access point
951 Controller
952 Memory
954 Inputting device
955 Display device
957 Network interface
958 Wired communication network
963 Wireless communication interface
964 Antenna switch
965 Antenna

The invention claimed is:

1. An information processing apparatus, comprising:
circuitry configured to:
transmit a first notification to a first apparatus, when at least some of functions of the information processing apparatus is to be temporarily paused, the first apparatus having a specific function of temporary pause within a predetermined period in response to the first notification;
transmit a second notification to a second apparatus that does not have the specific function of temporary pause, when at least some of functions of the information processing apparatus is to be temporarily paused, the second notification restraining transmission of data and being different from the first notification; and
control an exclusive period during the predetermined period based on a third notification to the second apparatus, the exclusive period being set for transmission of data between the information processing apparatus and the second apparatus,
wherein the circuitry is configured to set an additional exclusive period during the predetermined period in a case that the circuitry receives information from the second apparatus during the exclusive period, the information indicating that another data to be transmitted exists in the second apparatus, the additional exclusive period being set separately from the exclusive period and adjusted based on status information of the second apparatus.

2. The information processing apparatus according to claim 1, wherein the specific function is a function capable of understanding a frame for the first notification of temporary pause within the predetermined period.

3. The information processing apparatus according to claim 1, wherein the information processing apparatus is an information processing apparatus that has a function as a base station, and the first apparatus and the second apparatus are user terminals.

4. The information processing apparatus according to claim 3, wherein the circuitry configured to transmit the third notification to the second apparatus to cancel restraining transmission of data and to start the exclusive period, when the information processing apparatus performs function as the base station during the predetermined period, and transmit the second notification to the second apparatus again after the exclusive period elapsed.

5. The information processing apparatus according to claim 4, wherein the circuitry is configured to set at least one or more exclusive periods during the predetermined period.

6. The information processing apparatus according to claim 4, wherein the circuitry is configured to determine the predetermined period, based on information of the second apparatus or power supply information of the information processing apparatus.

7. The information processing apparatus according to claim 6, wherein the circuitry is configured to determine, as the configuration information of the second apparatus, at least one of a quantity or a ratio of the second apparatus connected to the information processing apparatus, a permissible delay of traffic handled by the second apparatus connected to the information processing apparatus and presence or absence of data to be sent to the information processing apparatus which is stored in the second apparatus.

8. The information processing apparatus according to claim 1, wherein the circuitry is configured to transmit the second notification to the second apparatus after a point of time of start of the predetermined period notified to the first apparatus.

9. The information processing apparatus according to claim 1, wherein the circuitry is configured to set the predetermined period which is longer than a temporary pause period of the information processing apparatus.

10. The information processing apparatus according to claim 1, wherein the circuitry is configured to transmit a frame, which includes information of the predetermined period and a start timing of the predetermined period, as the first notification to the first apparatus.

11. The information processing apparatus according to claim 1, wherein the circuitry is configured to transmit the first notification to the first apparatus upon receiving a fourth notification from the first apparatus, the forth notification indicating that the first apparatus has the specific function.

12. The information processing apparatus according to claim 1, wherein the temporary pause of the information processing apparatus is at least one of a temporary pause for allowing the information processing apparatus to enter a power saving state, a temporary pause of functions other than performing a function for other group the other group being different from a current group provided the functions by the information processing apparatus, and a temporary pause of functions other than searching for a new group to which the information processing apparatus is to belong.

13. An information processing apparatus, comprising:
circuitry configured to:
receive a first notification from other information processing apparatus, when at least some of functions of the other information processing apparatus is to be temporarily paused; and
control for performing a specific function of temporary pause within a predetermined period in response to the first notification;
wherein the other information processing apparatus transmits a second notification to a different apparatus that does not have the specific function of temporary pause, when at least some of functions of the other information processing apparatus is to be temporarily paused, the second notification restraining transmission of data and being different from the first notification, and controls an exclusive period during the predetermined period based on a third notification to the different apparatus, the exclusive period being set for transmission of data between the other information processing apparatus and the different apparatus,
wherein the other information processing apparatus sets an additional exclusive period during the predetermined period in a case that the other information processing apparatus receives information from the different apparatus during the exclusive period, the information indicating that another data to be transmitted exists in the different apparatus the additional exclusive period being set separately from the exclusive period and adjusted based on status information of the second apparatus.

14. The information processing apparatus according to claim 13, wherein the circuitry is configured to notify the other information processing apparatus that the information processing apparatus has the specific function for understanding a frame for the first notification of temporary pause within the predetermined period.

15. The information processing apparatus according to claim 13, wherein the predetermined period notified from the other information processing apparatus is longer than a temporary pause period set to the other information processing apparatus.

16. The information processing apparatus according to claim 13, wherein the circuitry is configured to receive a frame, which includes information of the predetermined period and a start timing of the predetermined period, as the first notification.

17. The information processing apparatus according to claim 13, wherein the circuitry is configured to transmit, to the other information processing apparatus, a fourth notification indicating that the information processing apparatus has the specific function, before receiving the first notification from the other information processing apparatus.

18. An information processing method, comprising:
transmitting a first notification to a first apparatus, when at least some of functions of the information processing apparatus is to be temporarily paused, the first apparatus having a specific function of temporary pause within a predetermined period in response to the first notification;
transmitting a second notification to a second apparatus that does not have the specific function of temporary pause, when at least some of functions of the information processing apparatus is to be temporarily paused, the second notification restraining transmission of data and being different from the first notification; and
controlling an exclusive period during the predetermined period based on a third notification to the second apparatus, the exclusive period being set for transmission of data between the information processing apparatus and the second apparatus,
wherein, in a case of receiving information from the second apparatus during the exclusive period, setting an additional exclusive period during the predetermined period, the information indicating that another data to be transmitted exists in the second apparatus, the additional exclusive period being set separately from the exclusive period and adjusted based on status information of the second apparatus.

19. The information processing method according to claim 18,
wherein the method further comprising transmitting the third notification to the second apparatus to cancel restraining transmission of data and to start the exclusive period, when the information processing apparatus performs function as a base station during the predetermined period, and transmitting the second notification to the second apparatus again after the exclusive period elapsed.

20. The information processing method according to claim 18,
wherein the method further comprising setting at least one or more exclusive periods during the predetermined period.

* * * * *